US011388970B2

(12) United States Patent
Gordon et al.

(10) Patent No.: US 11,388,970 B2
(45) Date of Patent: Jul. 19, 2022

(54) PORTABLE COMPUTER CASE WITH INTEGRATED STORAGE FEATURES

(71) Applicants: Joseph Gordon, Brooklyn, NY (US); Andrew Morrison, Boca Raton, FL (US)

(72) Inventors: Joseph Gordon, Brooklyn, NY (US); Andrew Morrison, Boca Raton, FL (US)

(73) Assignee: Joseph Gordon, Brooklyn, NY (US)

( * ) Notice: Subject to any disclaimer, the term of this patent is extended or adjusted under 35 U.S.C. 154(b) by 332 days.

(21) Appl. No.: 16/178,375

(22) Filed: Nov. 1, 2018

(65) Prior Publication Data

US 2019/0133280 A1    May 9, 2019

Related U.S. Application Data

(60) Provisional application No. 62/581,503, filed on Nov. 3, 2017.

(51) Int. Cl.
*A45C 13/02*    (2006.01)
*A45C 11/00*    (2006.01)
*G06F 1/16*    (2006.01)

(52) U.S. Cl.
CPC .............. *A45C 13/02* (2013.01); *A45C 11/00* (2013.01); *G06F 1/1628* (2013.01); *A45C 2011/003* (2013.01); *A45C 2013/025* (2013.01)

(58) Field of Classification Search
CPC ... A45C 11/00; A45C 13/02; A45C 2011/003; A45C 2013/025; G06F 1/1628
USPC ........................................................ 206/320
See application file for complete search history.

(56) References Cited

U.S. PATENT DOCUMENTS

| | | | |
|---|---|---|---|
| 5,348,347 A * | 9/1994 | Shink | B42D 5/006 206/38 |
| 5,664,673 A | 9/1997 | Perry | |
| 5,808,865 A * | 9/1998 | Alves | G11B 33/02 206/305 |
| 5,835,344 A | 11/1998 | Alexander | |
| 6,026,961 A | 2/2000 | McCarthy et al. | |
| 6,149,001 A | 11/2000 | Akins | |
| 6,206,480 B1 * | 3/2001 | Thompson | G06F 1/1628 200/334 |
| 6,269,948 B1 * | 8/2001 | Jackson | A45C 7/0095 108/43 |
| 6,392,876 B1 | 5/2002 | Ramonowski | |
| 6,711,006 B2 | 3/2004 | Chen | |
| 6,974,223 B2 * | 12/2005 | Krietzman | F21V 33/0052 362/253 |
| 7,393,242 B1 | 7/2008 | Saje | |
| 7,921,997 B2 * | 4/2011 | Burns | G06F 1/1626 206/320 |
| 8,567,578 B2 * | 10/2013 | Cuong | A45F 5/00 190/107 |
| 8,763,795 B1 * | 7/2014 | Oten | A45C 11/00 206/45.23 |

(Continued)

*Primary Examiner* — Jacob K Ackun
(74) *Attorney, Agent, or Firm* — Sheridan Ross P.C.

(57) ABSTRACT

A case configured to be interconnected to a portable computer is presented. The case is configured to selectively retain at least one peripheral device. In various embodiments, the case comprises internal storage compartments and features, at least some of which are operable to be store and house devices that are in communication with one another or with a portable computer to which the case is connected.

17 Claims, 23 Drawing Sheets

(56) References Cited

U.S. PATENT DOCUMENTS

| | | |
|---|---|---|
| 9,693,614 B1 | 7/2017 | Brian |
| 2003/0008563 A1* | 1/2003 | Nishio .................. H01R 13/22 |
| | | 439/625 |
| 2005/0152621 A1* | 7/2005 | Healy ...................... B42F 7/00 |
| | | 383/22 |
| 2006/0226040 A1* | 10/2006 | Medina ................ G06F 1/1616 |
| | | 206/320 |
| 2007/0090007 A1 | 4/2007 | Ames |
| 2007/0119735 A1* | 5/2007 | Moser .................. G06F 1/1628 |
| | | 206/320 |
| 2008/0202959 A1* | 8/2008 | Chu ..................... G06F 1/1628 |
| | | 206/320 |
| 2009/0133316 A1 | 5/2009 | Richter |
| 2010/0044259 A1* | 2/2010 | Wang .................... A45C 13/30 |
| | | 206/320 |
| 2011/0011761 A1* | 1/2011 | Enmon ..................... A45F 3/04 |
| | | 206/320 |
| 2012/0120184 A1* | 5/2012 | Fornell ................... H04N 7/15 |
| | | 348/14.12 |
| 2014/0038450 A1* | 2/2014 | Vroom ................. H01R 13/518 |
| | | 439/374 |
| 2016/0216742 A1 | 7/2016 | Lee |

\* cited by examiner

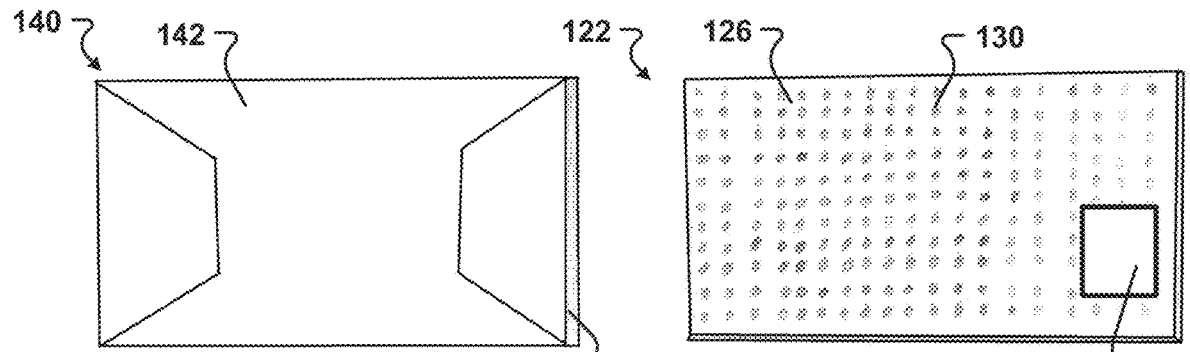
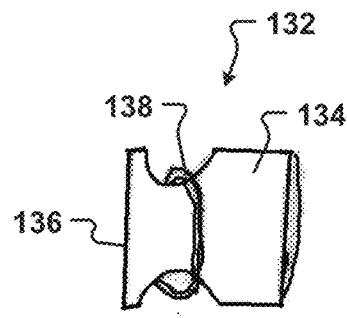
Fig. 2D
Fig. 2F
Fig. 2C

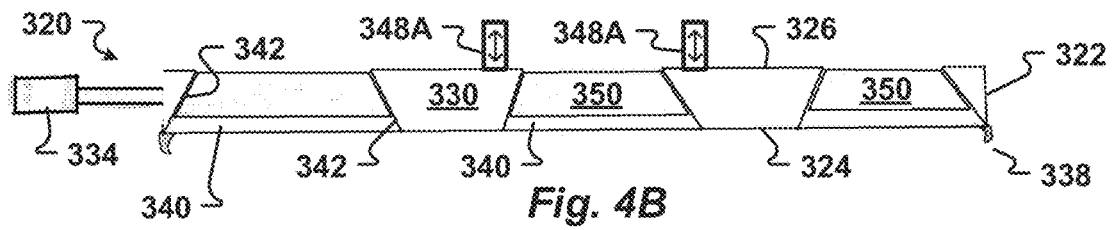
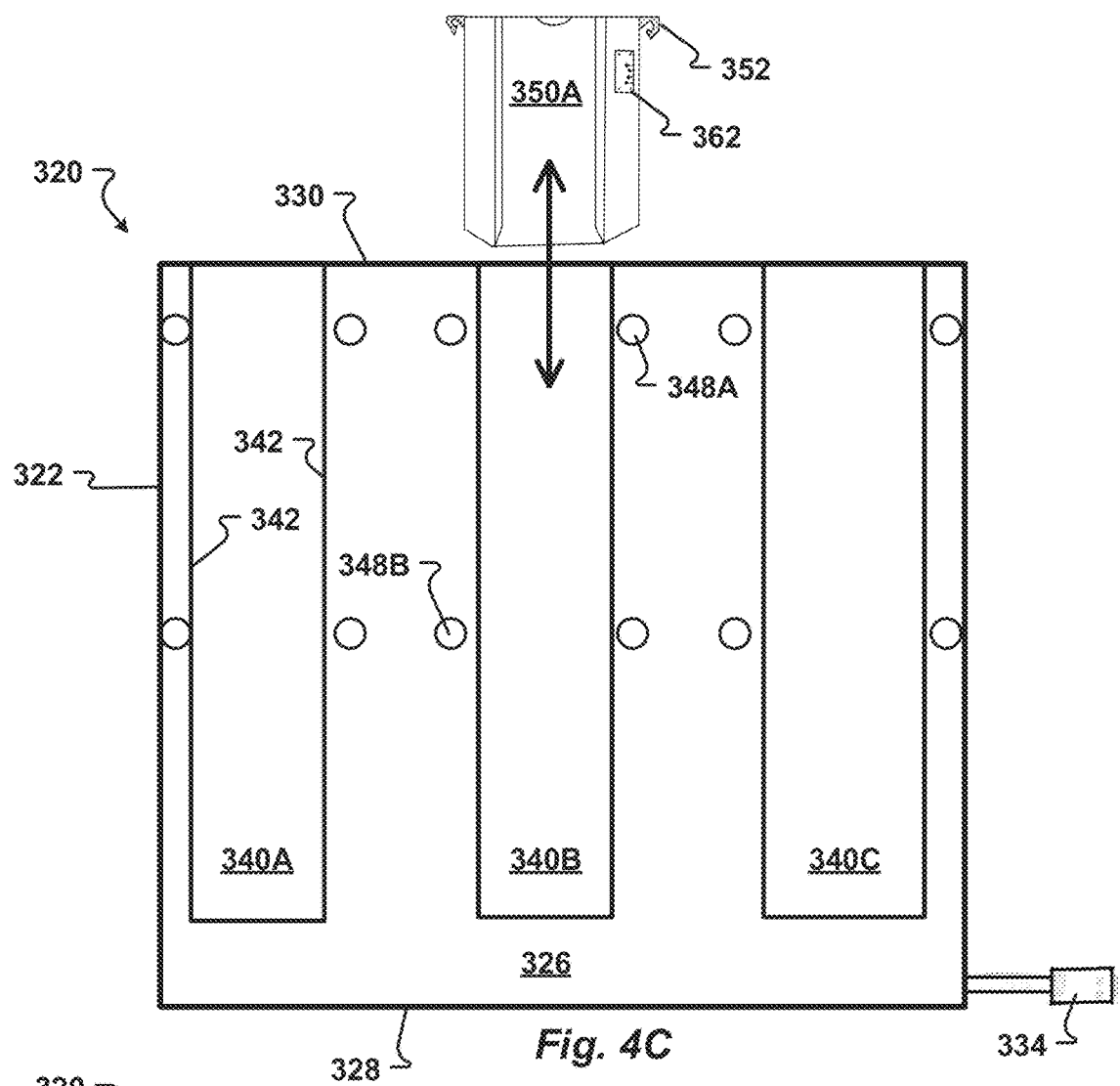
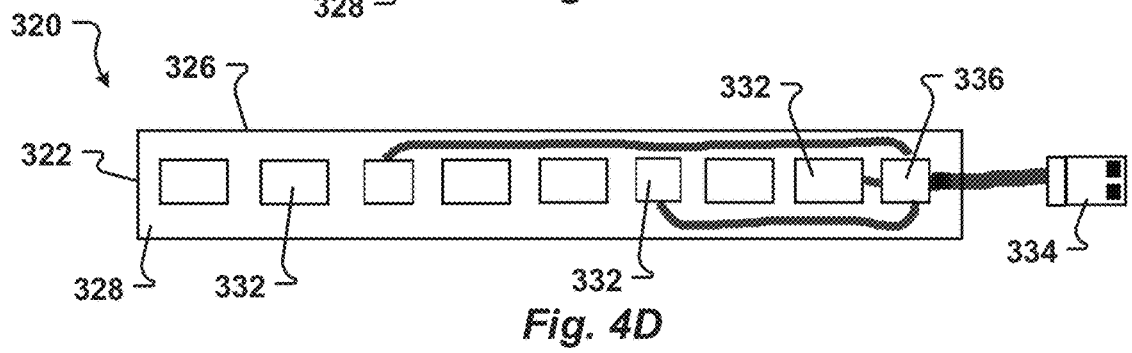

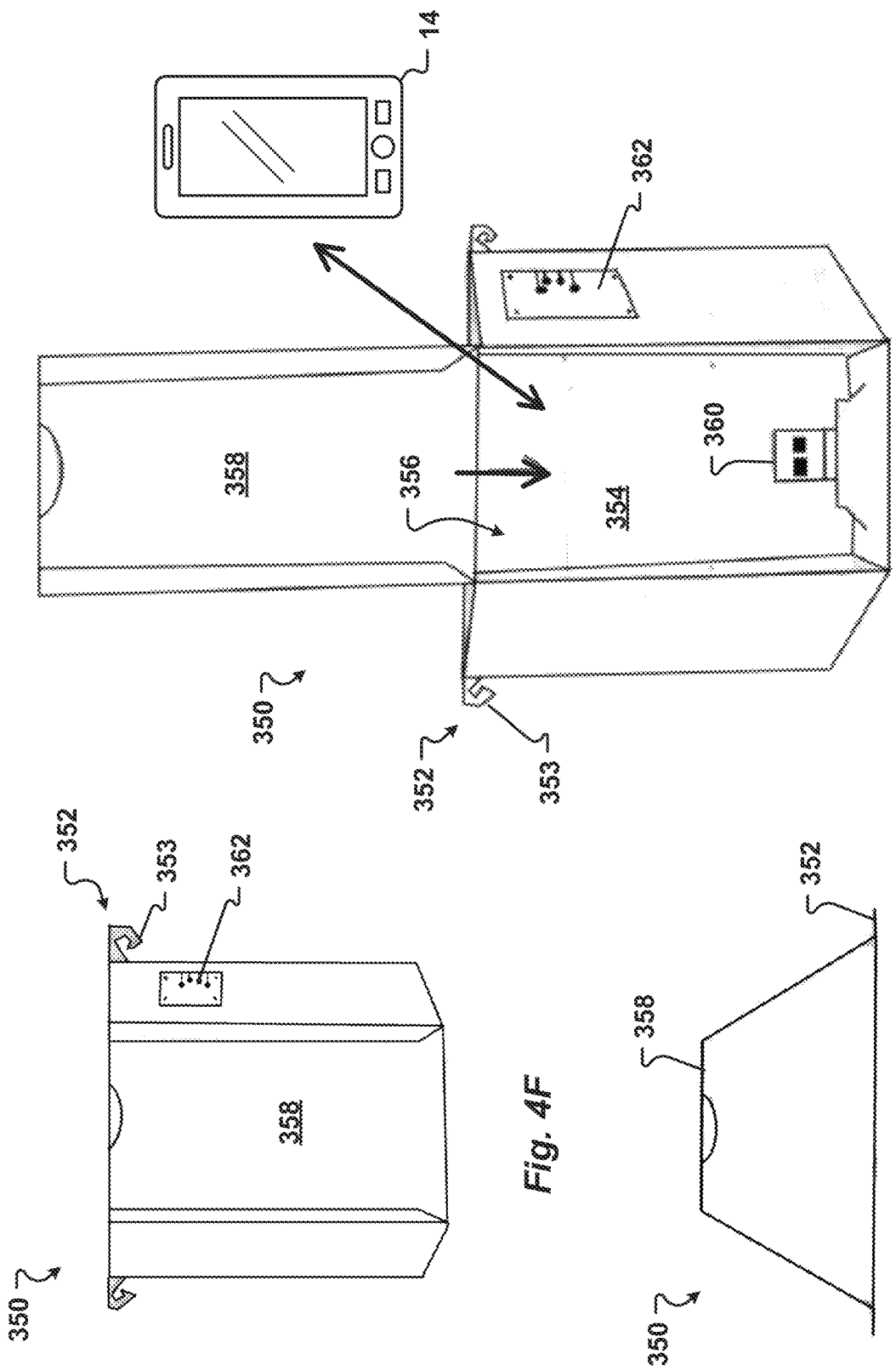

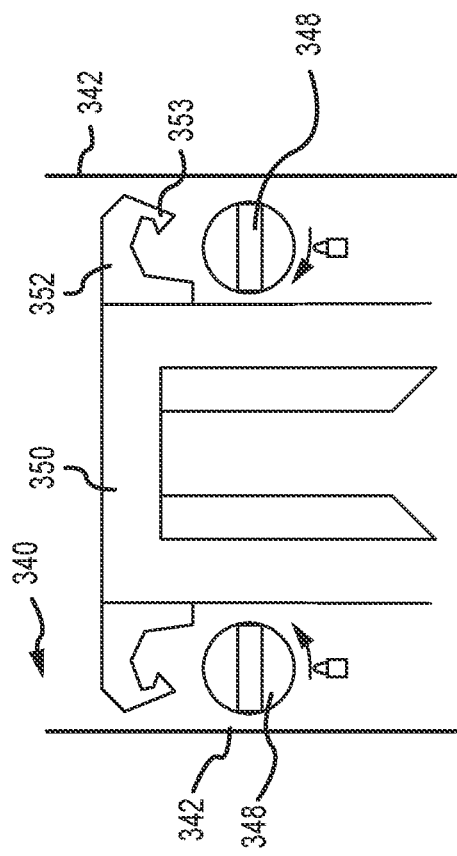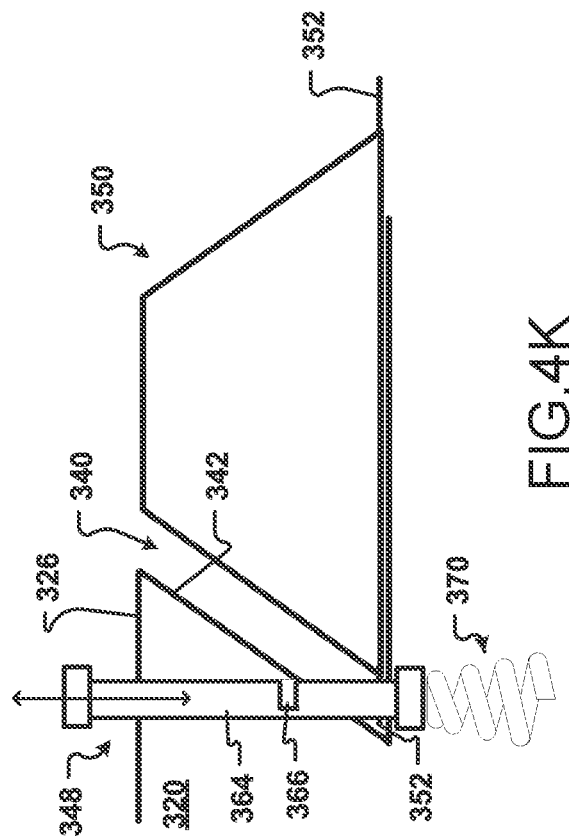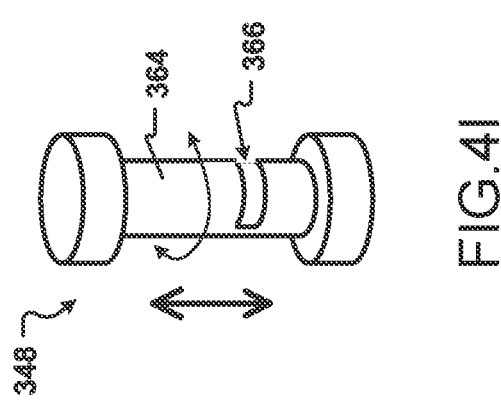

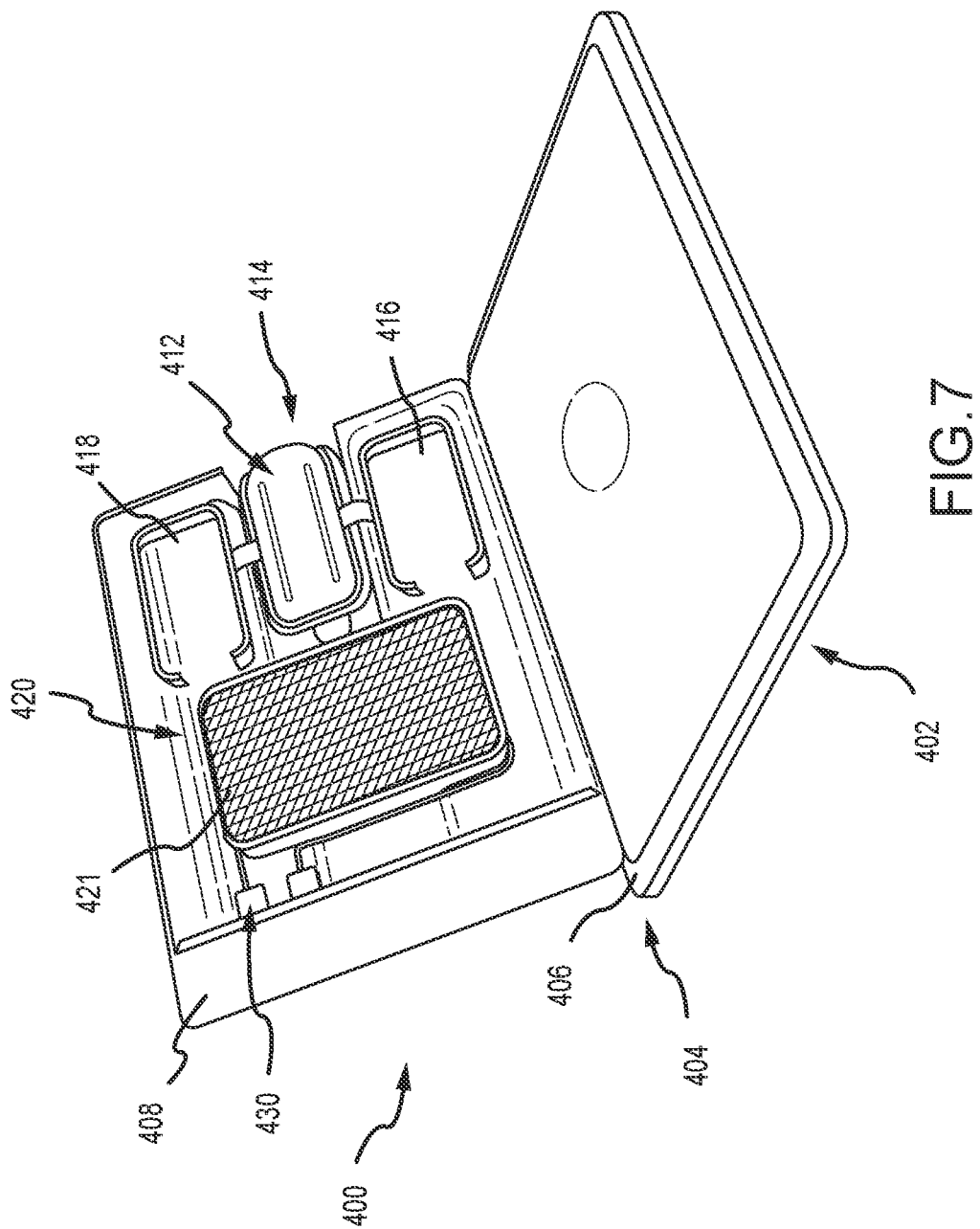

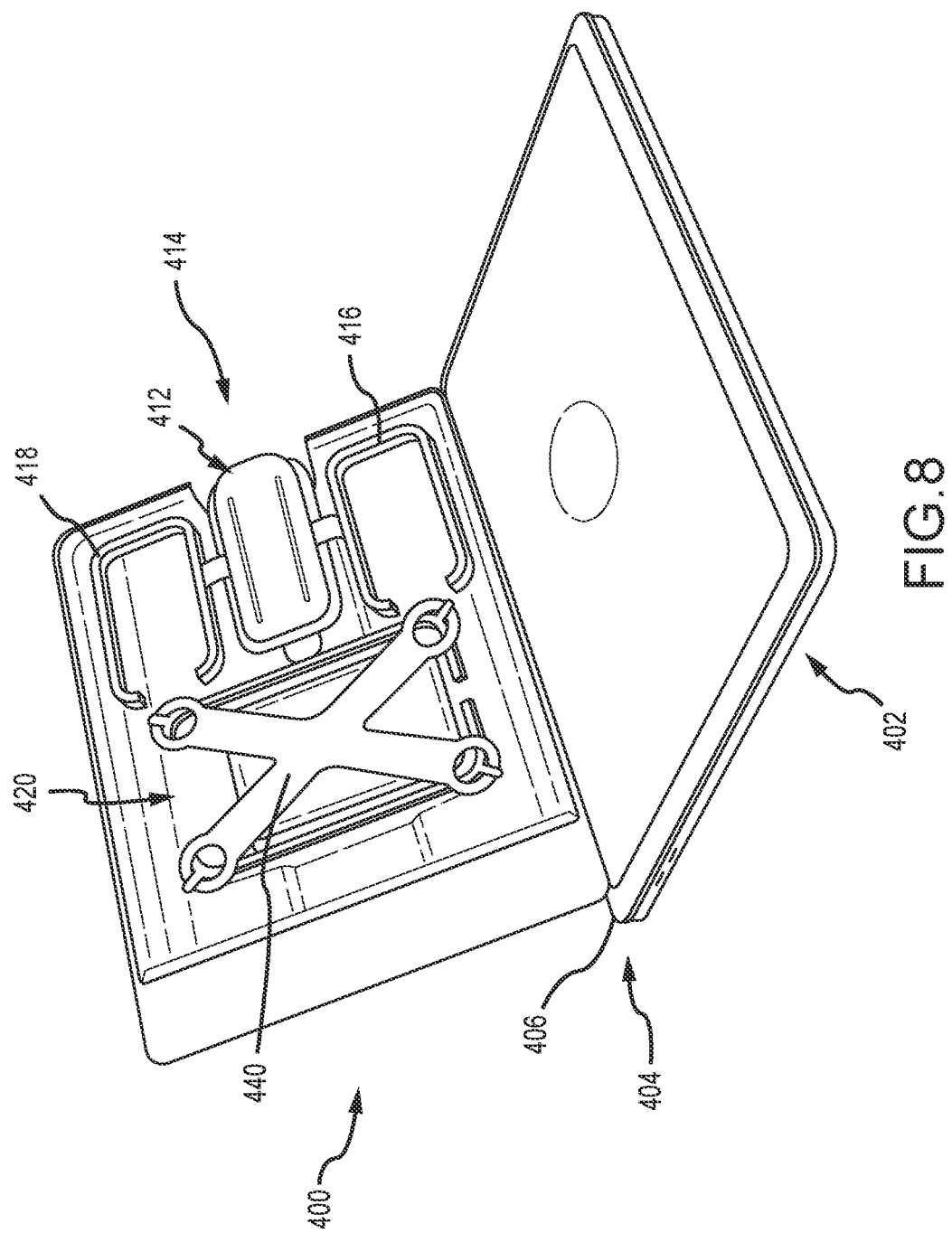

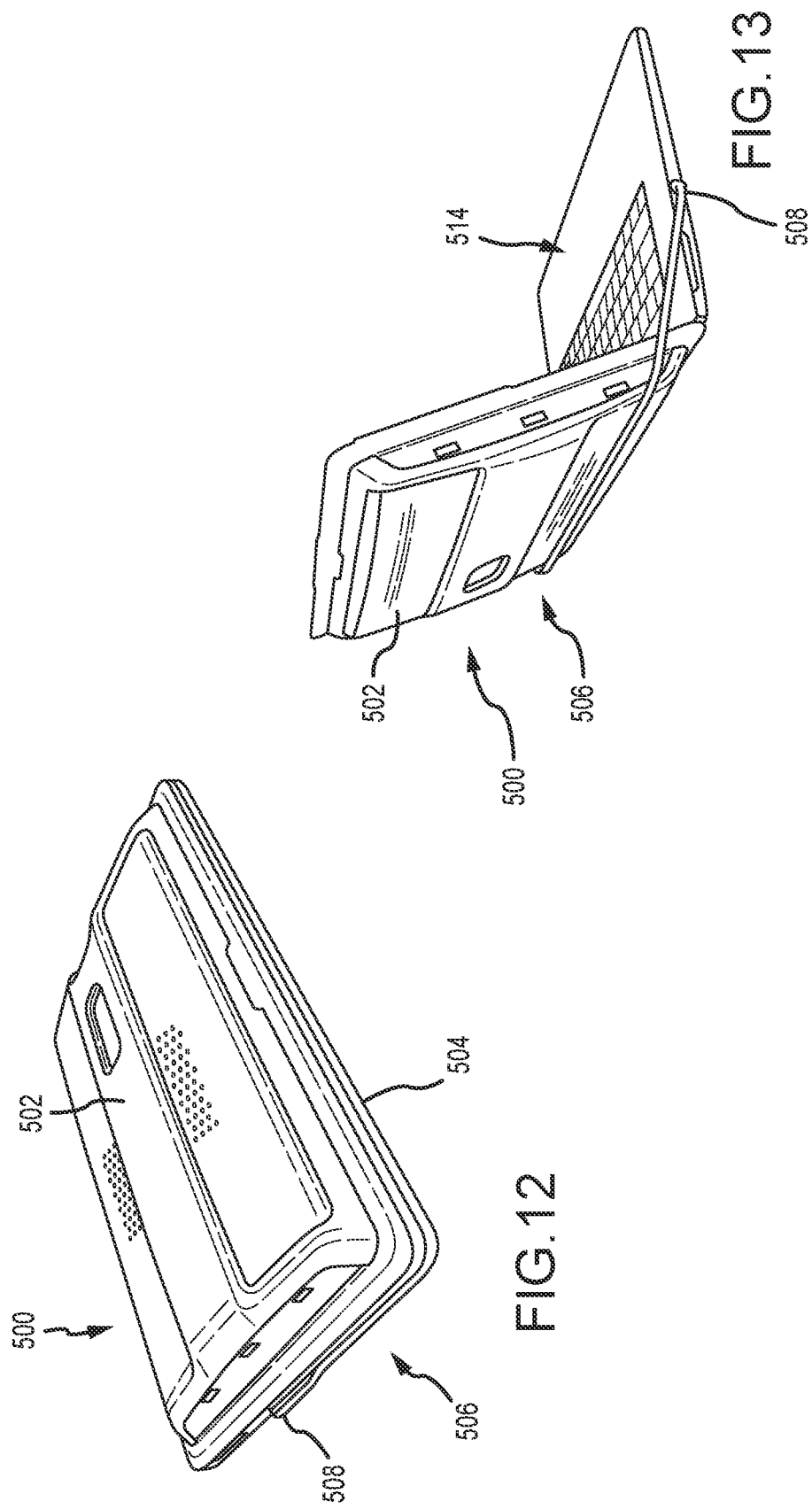

PORTABLE COMPUTER CASE WITH INTEGRATED STORAGE FEATURES

This U.S. Non-Provisional patent application claims the benefit of priority from U.S. Provisional Patent Application Ser. No. 62/581,503, filed Nov. 3, 2017, the entire disclosure of which is hereby incorporated by reference.

FIELD

The present disclosure relates generally to cases with integrated storage features. More particularly, embodiments of the present disclosure relate to cases configured to be provided with a portable computer. The cases are configured to hold various accessories or peripheral devices that can be connected to the portable computer.

BACKGROUND

Portable computers, including laptop computers and tablet devices, provide many benefits to users, including mobility and convenience. Users frequently connect external accessories and peripheral devices to portable computers to improve functionality, provide additional storage or battery power, or to increase the number of inputs or jacks for electrical connections to the portable computer. However, as the number of peripheral devices connected to a portable computer increase, the mobility and convenience associated with the portable computer may decrease. For example, the area around the portable computer may become cluttered with external cords. It may also be difficult to carry or use the portable computer when external peripheral devices are connected. When the external peripheral devices are disconnected, they may be misplaced when the portable computer is moved.

The following U.S. Patents and U.S. Patent Publications relate to storage devices for computers and are hereby incorporated by reference in their entireties: U.S. Pat. No. 5,664,673 to Perry; U.S. Pat. No. 5,835,344 to Alexander; U.S. Pat. No. 6,026,961 McCarthy; U.S. Pat. No. 6,149,001 to Akins; U.S. Pat. No. 6,392,876 to Ramonowski; U.S. Pat. No. 6,711,006 to Chen; U.S. Pat. No. 7,393,242 to Saje; U.S. Pat. No. 7,921,997 to Burns; U.S. Pat. No. 9,693,614 to Brian; U.S. Patent Publication 2005/0152621 to Healy; U.S. Patent Publication 2007/0090007 to Ames; and U.S. Patent Publication 2009/0133316 to Richter.

The aforementioned references fail to teach various novel features of the present disclosure as shown and described herein including, but not limited to features that may be selectively positioned relative to a computer, novel receiving portions, and various devices and means for organizing accessories and related wiring.

SUMMARY

Various embodiments of the present disclosure provide new and useful cases for portable computers. The cases are configured to be interconnected to a portable computer. Peripheral devices can be secured to the case. The case can include retainers for cords of the peripheral devices. In one embodiment, the case includes a dock to secure a peripheral device to the case. The dock can include an interface to connect a peripheral device to the portable computer (e.g. via USB or similar). In another embodiment, a system is provided comprising a case and pegs with heads that can be adhered to a peripheral device. In still another embodiment, a plurality of pockets are provided with and/or interconnected to the case, and wherein each pocket is configured to receive one or more peripheral devices. In yet another embodiment, the case includes one or more slots configured to retain a container, the container including a chamber with an interface to connect to a peripheral device. It is contemplated that various features and devices shown and/or described with respect to one embodiment may be combined with or substituted for features or devices of other embodiments regardless of whether or not such a combination or substitution is specifically shown or described herein.

One aspect of the present disclosure is to provide a case configured to be interconnected to an exterior surface of a display screen of a portable computer. The case includes a back portion configured to be proximate to the display exterior surface when the case is interconnected to or otherwise provided in combination with the display screen. Docks for peripheral devices are provided with the case. Each dock is configured and operable to secure a peripheral device to the case. Peripheral devices of the present application are contemplated as comprising, but are not limited to, external storage devices, mice, cameras, smartphones and tablets, personal activity trackers, batteries, and various other devices that are to be connected to or otherwise used in combination with a computer. In one embodiment, at least one retention device is associated with one or more of the docks.

Optionally, one or more of the docks comprises an interface to electrically connect a peripheral device to the portable computer. For example, in some embodiments, a cable router is associated with a dock. The cable router is configured to direct a cable from a peripheral device positioned in a dock to the portable computer and/or to a second dock. In one embodiment, the cable router comprises a groove or channel formed in a back portion of the case. Optionally, in another embodiment, the cable router is a passage through an interior of the case. Additionally, or alternatively, the cable router further comprises one or more clips.

In one embodiment, a case is provided that comprises at least three docks. The docks are configured to retain one or more peripheral devices such as a hub device, a memory device, a battery, a pointer, and the like. In one embodiment, one of the peripheral devices is an external hard drive. Optionally, the pointer can be a mouse.

In some embodiments, a configurable case is provided. The configurable case generally comprises a base piece and a cover. The base piece is configured to engage an exterior surface of a display screen of a portable computer. A front portion of the base piece includes a plurality of apertures. The apertures are contemplated as being arranged in a grid pattern and are operable to receive a male member.

In some embodiments, the apertures are operable to receive a shank of a peg. In such embodiments, the pegs comprise a head configured to be interconnected to a peripheral device. A user may thus arrange pegs in the apertures in a desired orientation and subsequently attach a peripheral device to the peg heads. In one embodiment, the peg head includes an adhesive such that the peg may be releasably interconnected to a selected peripheral device. Alternatively, the peg head may use suction to releasable interconnect to the peripheral device.

The cover of the configurable case is selectively interconnectable to the base piece. In one embodiment, the cover is configured engage a portion of the portable computer. Optionally, the cover is formed of a material that is transparent.

In further embodiments, a case is provided comprising one or more pockets. The case comprises a body. The body is configured to be attached to a portable computer. Pockets are interconnected to or otherwise provided with a front portion of the body. Each pocket is configured and operable to receive a peripheral device. It is contemplated that cases of such embodiments comprise as few as one and as many as twenty pockets. In one embodiment, the case comprises nine pockets. A cable retainer is contemplated as being associated with one or more of the pockets. Optionally, the case may include four or more cable retainers.

In some embodiments, a case is provided that is configured to receive containers for peripheral devices. In certain embodiments, a case is provided that comprises a body configured to be attached to an exterior surface of a display screen of a selected portable computer. The body is operable to be attached to the portable computer in a manner the same as, or similar to, one or more other cases of the present disclosure.

In such embodiments, a front portion of the body comprises at least one slot. The slot is configured to receive a container. In one embodiment, a retainer is associated with the slot to selectively engage a container. The container includes a chamber for a selected peripheral device. An interface port is associated with the chamber. The container includes a connector on an exterior surface. The exterior connector of the container is configured to engage an interface jack within a slot when the container is positioned in the slot. A cable with an interface extends from the body to electrically connect the container to a portable computer to which the case is configured to be connected.

In various embodiments, "portable computers" are contemplated as comprising laptop computers, tablets, and any other portable computer that may be developed in the future. As used herein, a "peripheral device" means any accessory that may be used with, or connected to, a portable computer. For example, peripheral devices include, but are not limited to: memory devices (such as hard drives, flash drives, CD ROM drives, and the like); power supplies; pointers (including a mouse, a trackball, and similar devices); input devices (such as keyboards and numeric keypads), hub devices (such as a USB bus); lights; microphones; and speakers.

Although generally referred to herein as an "interface port," "interface," "jack," "external connector," "a USB connector," "a USB hub," cases of the present disclosure can be configured to transmit at least one of data and power to a peripheral device with any type of communication protocol or standard, whether currently known or developed in the future.

In one embodiment, a storage system for electronic devices is provided that comprises a base member operable to be secured to an electronic device, such as a preexisting personal computer. A cover member is hingedly secured to the base member, and the cover member comprises a plurality of storage compartments for selectively receiving and storing one or more peripheral devices. Each of the plurality of storage compartments comprises an opening and is operable to and sized to receive a device in a manner such that a peripheral device can be provided in communication with at least one of a preexisting personal computer and an additional peripheral device. The cover member is rotatable between a first position comprising a substantially closed position wherein at least some of the storage compartments are not accessible to a user, and a second position comprising an open position wherein the cover member is rotated away from the base member and wherein the storage recesses are accessible to a user.

In another embodiment, a storage system for electronic devices is provided that comprises a base member operable to be secured to an electronic device. A cover member is hingedly secured to the base member, and the cover member comprises an internal storage compartment. The internal storage compartment comprises a partially-open storage compartment and a sidewall extending from the cover member, and the storage compartment is operable to provide at least one peripheral device in physical communication with at least one additional device. The cover member is rotatable between a first position comprising a substantially closed position wherein the storage recess is not accessible to a user, and a second position comprising an open position wherein the cover member is rotated away from the base member and wherein the internal storage compartment is accessible to a user.

In another embodiment, a storage case is provided that is operable to be connected to an electronic device. The case comprises a rotatable cover member comprising an internal storage area with a plurality of internal storage compartments. At least one of the internal storage compartments comprises a partially-open compartment having sidewall extending from the rotatable cover member such that at least one physical connection is operable to extend to and from an internal area of the at least one internal storage compartment. The cover member is rotatable about a hinge between a first position comprising a substantially closed position, and a second position comprising an open position wherein plurality of internal storage compartments are accessible to a user.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE FIGURES

The accompanying drawings, which are incorporated herein and constitute a part of the specification, illustrate embodiments of the invention and together with the Summary given above and the Detailed Description of the drawings given below serve to explain the principles of these embodiments. In certain instances, details that are not necessary for an understanding of the disclosure or that render other details difficult to perceive may have been omitted. It should be understood, of course, that the invention is not necessarily limited to the particular embodiments illustrated herein. Additionally, it should be understood that the drawings are not necessarily to scale.

FIG. 2B is a front elevation view of a base piece of the case of FIG. 2A;

FIG. 2C is a right elevation view of the base piece of FIG. 2B;

FIG. 2D is a side elevation view of a peg of an embodiment of the present disclosure;

FIG. 2E is a front elevation view of a cover of the case of FIG. 2A;

FIG. 2F is a right elevation view of the cover of FIG. 2E;

FIG. 4B is a top plan view of the case of FIG. 4A;

FIG. 4C is a front elevation view of the case of FIG. 4B;

FIG. 4D is a bottom plan view of the case of FIG. 4B;

FIG. 4F is a top plan view of a container of one embodiment of the present disclosure;

FIG. 4G is a front elevation view of the container of FIG. 4H;

FIG. 4H is another top plan view of the container of FIG. 4G and illustrating a cover of the container in an open position;

FIG. 4I is a perspective view of a retainer of an embodiment of the present disclosure;

FIG. 4J is a top view of a portion of the case illustrating a container within a slot proximate to a retainer; and FIG. 4K is a partial cross-sectional elevation view of a portion of a slot and illustrating a container proximate to a retainer.

FIG. 7 is a perspective view of a case in an open position according to one embodiment of the present disclosure.

FIG. 8 is a perspective view of a case in an open position according to one embodiment of the present disclosure.

FIG. 9b is a detailed elevation view of the portion of the case shown in FIG. 9a.

FIG. 12 is a perspective view of a device case and a device according to the embodiment of FIG. 10.

FIG. 13 is a perspective view of a device case and a device according to the embodiment of FIG. 10.

DETAILED DESCRIPTION

Figure 1A:
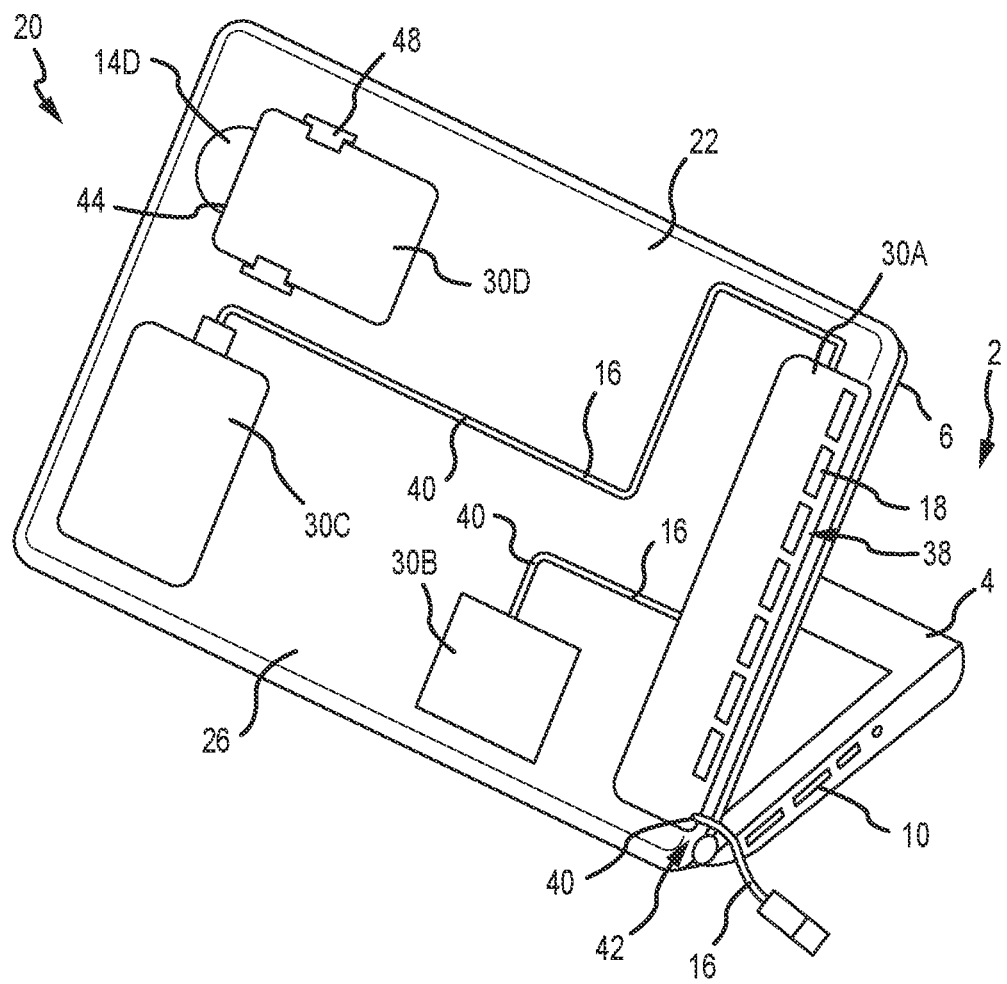
FIG. 1A is a front perspective view of a case of one embodiment of the present disclosure interconnected to a display screen of a portable computer.

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the present disclosure into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the disclosure.

Referring now to FIGS. 1A-1G, one embodiment of a case 20 of the present disclosure is generally illustrated. The case 20 is configured to be interconnected to an exterior surface of a display screen 6 of a portable computer 2. The case 20 generally includes a body 22 with a back portion 24 and a face portion 26.

Figure 4A:
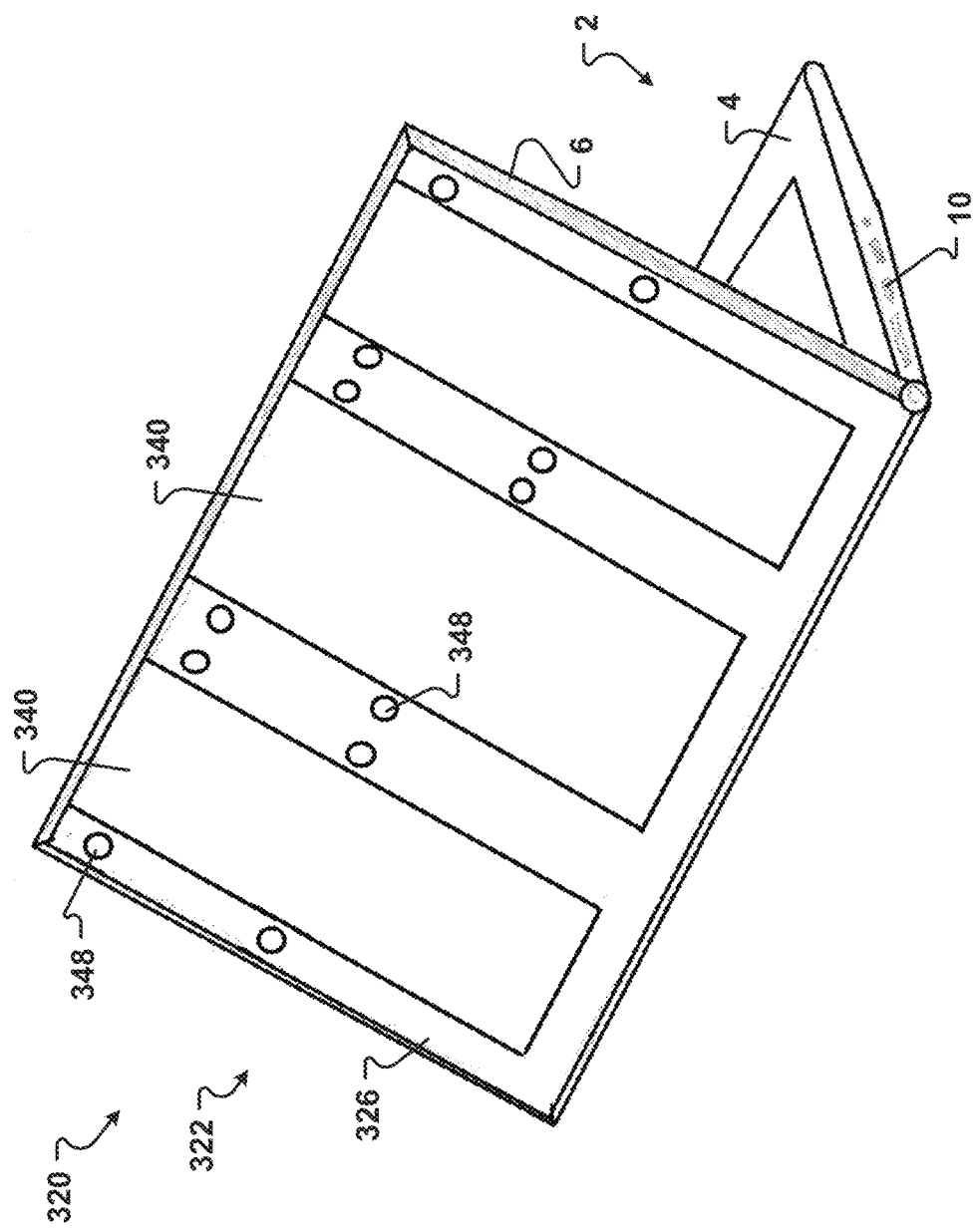
FIG. 4A is a front perspective view of a case of still another embodiment of the present disclosure.

The body 22 is configured to attach to the display exterior surface such that the back portion 24 faces the display screen 6. More specifically, in one embodiment, the case body 22 is formed to engage the display screen 6 of the portable computer 2. The case body 22 can be configured to frictionally engage the display screen. Optionally, the case body 22 can include one or more flanges to engage the display screen. The flanges may be the same as, or similar to, the flanges 338 described in conjunction with FIG. 4B. One or more edges of the case body 22 can include a flange configured to extend around a portion of the display screen. In one embodiment, the case body 22 can include one or more of a fastener, a snap, and a clasp that engages a portion of the display screen. Additionally, or alternatively, the body 22 and the display screen 6 can be interconnected with a hook and loop material, such as Velcro®.

The case body 22 can optionally include a suction device to selectively engage the display screen. The suction device may include a flexible body configured to create a suction force in response to movement of an actuator. The actuator can be a knob, lever, cam and the like.

Additionally, or alternatively, the case body 22 can be configured to snap to the display screen. More specifically, the case body can include two or more projections that are at least partially flexible. To attach the case body 22 to the display screen, the projections may bend and then bias against a portion of the display screen. Optionally, the projections can be flanges such as flanges 338.

The body 22 can optionally include a strap 28 (illustrated in FIG. 1D) configured to engage a portion of the computer display screen 6. In one embodiment, the strap 28 extends from a narrow edge of the body 22 to an adjacent long edge of the body. The strap 28 may be oriented generally transverse to each of the narrow edge and the long edge. Accordingly, a corner of a computer display screen 6 may be positioned between the back portion 24 of the body and the strap 28. In one embodiment, the strap 28 is formed from a transparent or translucent material. In another embodiment, at least one end of the strap 28 is selectively interconnectable to the body 22. In another embodiment, the tension of the strap 28 may be altered. Optionally, the body includes two straps 28. A first strap 28 may extend from a first short edge of the body to the long edge. A second strap 28 may extend from a second short edge to the long edge of the body. Other arrangements of the straps 28 are contemplated. For example, a strap 28 may optionally extend from a first narrow edge of the body 22 to an opposite second narrow edge of the body.

Figure 1B:
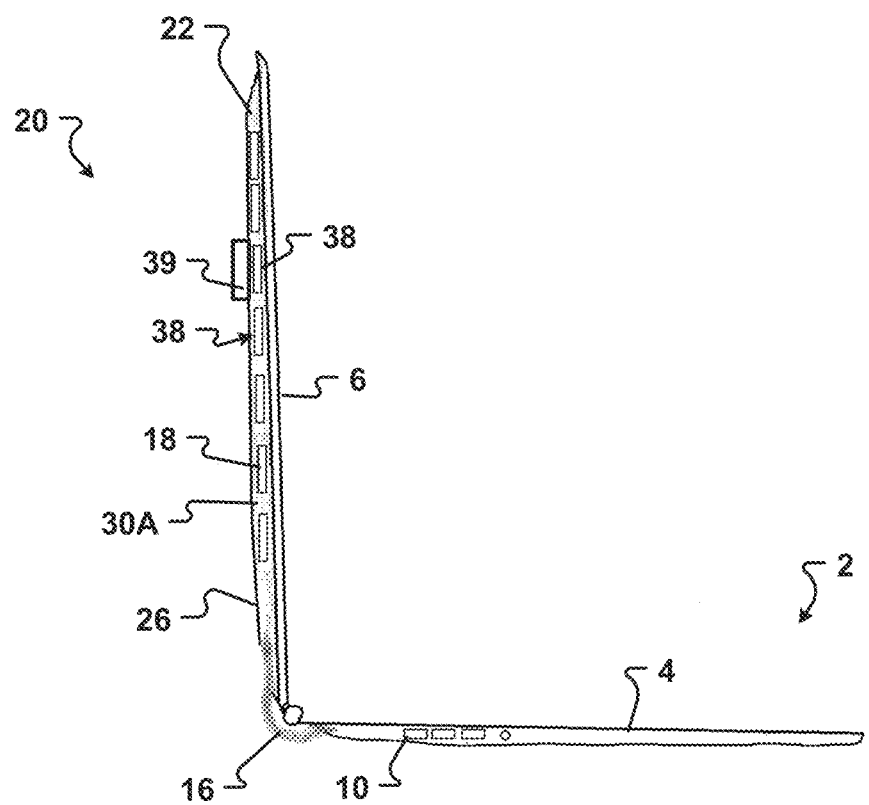
FIG. 1B is a right elevation view of the case of FIG. 1A.
Figure 1C:
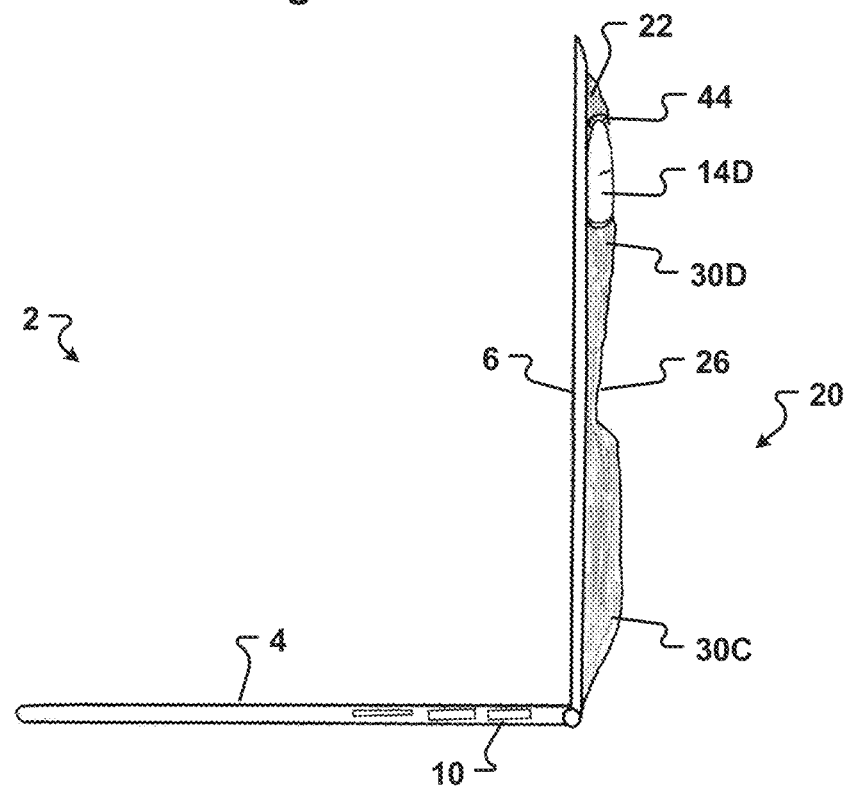
FIG. 1C is a left elevation view of the case of FIG. 1A.
Figure 1D:
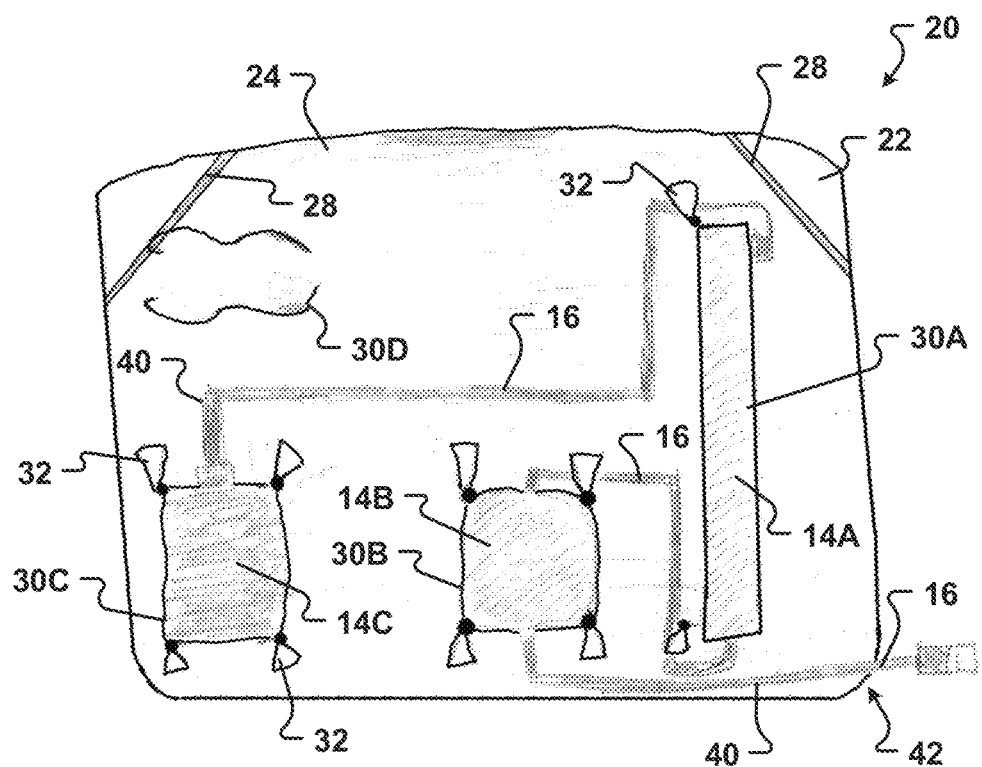
FIG. 1D is a rear elevation view of the case of FIG. 1A.
Figure 1E:
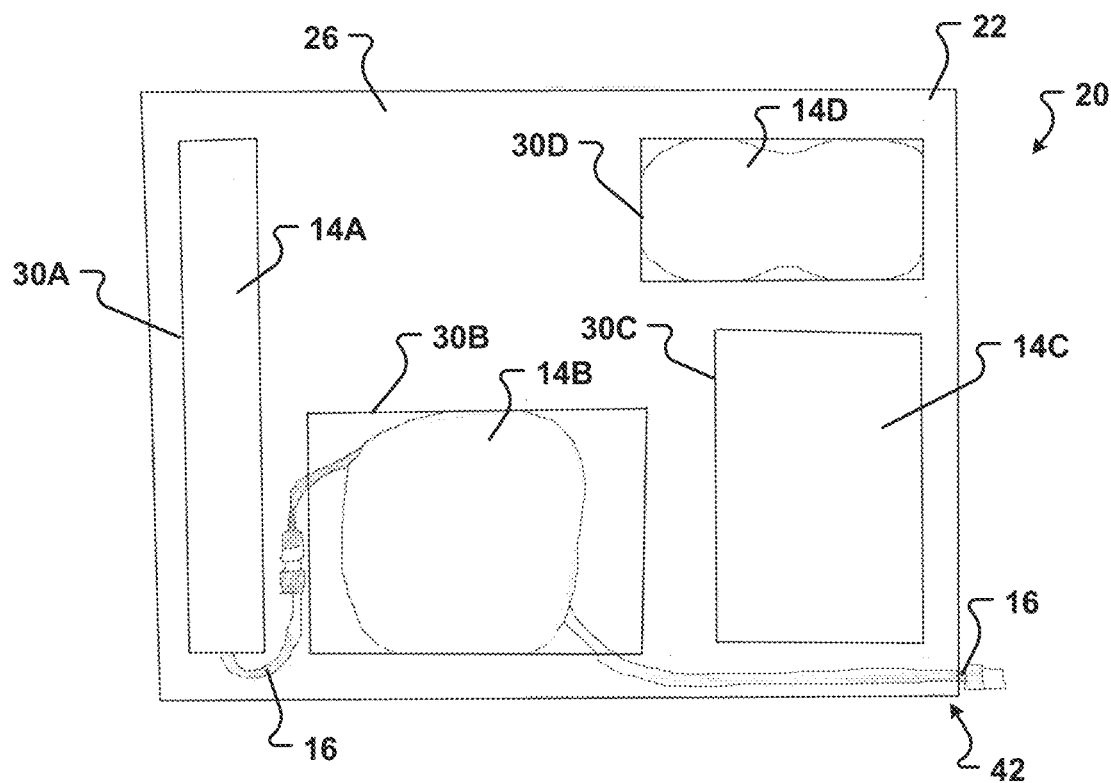
FIG. 1E is a front elevation view of the case of FIG. 1A showing peripheral devices positioned in docks in phantom lines.
Figure 1G:
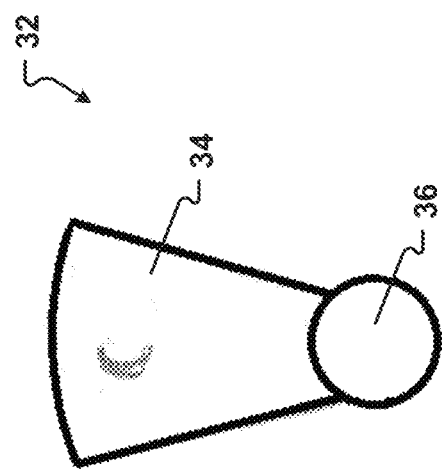
FIG. 1G is a top plan view of a retention device of the present disclosure.

Referring now to FIG. 1D, the back portion 24 of the body 22 includes docks 30 for peripheral devices 14. Each dock 30 is configured to secure a peripheral device 14 to the body 22. The docks 30 can be of a variety of different shapes and sizes. Further, a dock 30 can be configured to retain a particular peripheral device 14. More specifically, a first dock 30A may be configured to retain a first peripheral device 14. A second dock 30B can be configured to retain a different second peripheral device 14.

In one embodiment, at least one retention device 32 can be associated with one or more of the docks 30. The retention devices 32 may be clips, bands, latches, and the like. Optionally, a retention device 32 may include a rotating latch 34. More specifically and referring now to FIG. 1G, in one embodiment, a retention device 32 includes a post 36 projecting from the back portion 24 of the case body. A latch 34 is rotatably interconnected to the post 36. The latch 34 can have a shape formed from a portion of a circle, such as approximately one-quarter of a circle. Stated differently, in one embodiment, the latch 34 has a wedge shape. When a peripheral device 14 is positioned in the dock 30, the latch 34 can be rotated over a portion of the peripheral device 14 to frictionally retain the peripheral device 14 in the dock 30.

Optionally, one or more of the docks 30 can include an interface to electrically connect a peripheral device 14 to the portable computer 2. The interface may optionally transmit power to or from the peripheral device 14 and the portable computer. In one embodiment, the interface is one of a male or a female USB port. Other types of interfaces which are compatible with different communications protocols can be used with the cases of the present disclosure. In one embodiment, at least one dock interface is compatible with an Apple Inc. Lightning connector. However, the cases 20 of the present disclosure can include docks 30 with interfaces configured to transmit at least one of data and power to a peripheral device using any known or future-developed communication protocol or standard.

In one embodiment, the case includes a first dock 30A configured to retain a first peripheral device 14A. The first peripheral device 14A may be a hub device including a plurality of interface ports 18. The first dock 30A can be configured to retain a hub device 14A with a variety of different types, numbers, and locations of interface ports. Optionally, the first dock 30A can receive a hub device 14A which includes from 2 to 10 interface ports 18. In one embodiment, at least one of the interface ports is a USB port.

Referring now to FIG. 1B, the first dock 30A optionally includes at least one interface aperture 38 formed in the face portion 26 of the case body 22. The interface aperture 38 is aligned with respect to an interface port 18 of the hub device 14A. More specifically, the interface aperture 38 can provide access for a connector to the interface port 18. Optionally, the interface apertures 38 can have a width of about 0.75 inches and a height of about 0.5 inches. In one embodiment, a cover 39 (illustrated in FIG. 1B) can be associated with one or more of the interface apertures 38. In this manner, the cover 39 can be closed when the interface port 18 is not in use. The cover 39 can be configured to slide, rotate, or pivot with respect to an associated interface aperture 38 to selectively close the aperture. In one embodiment, at least one edge of the cover 39 is interconnected to the case 20.

Optionally, the first dock 30A further includes a first cable router 40. The first cable router 40 is configured to direct a cable 16 from the hub device 14A to the portable computer 2 to which the case 20 is configured to be interconnected. In one embodiment, the first cable router 40 is a groove or channel formed in the back portion 24 of the case body 22. Optionally, in another embodiment, the first cable router is a passage through an interior of the case body 22.

The first cable router 40 can include an exit point 42. The exit point 42 may be positioned in a predetermined portion of the case 20. In one embodiment, the exit point 42 is proximate to a corresponding interface port 10 of the portable computer 2. In this manner, the cable 16 of the hub device 14A may exit from the cable router 40 of the case 20 proximate to an interface port 10 of the portable computer 2.

In one embodiment, the case 20 includes a second dock 30B. The second dock 30B can be configured to retain a peripheral device 14 compatible with the hub device. More specifically, the second dock 30B can be configured to retain a cable device with a retractable extension cable 16, such as a retractable USB connector. The cable device 14B can include a port to receive the cable from the hub device. A cable 16 of the cable device 14B can be routed through a second cable router 40 associated with the second dock 30B to the exit aperture 42 of the case 20. In this manner, the cable device may be used to connect the hub device to the portable computer 2.

Optionally, the case 20 may include a third dock 30C adapted to retain a third peripheral device 14C. The third peripheral device 14C can be a memory device, a battery, and the like. In one embodiment, the third dock 30C is configured to retain a memory device, such as an external hard drive. The third dock 30C can, optionally, include a third cable router 40. The third cable router 40 may direct a cable 16 to one of the first dock 30A and an exit point 42 of the case 20. Accordingly, the cable 16 of the third peripheral device 14C can be connected to either the hub device 14A or to the portable computer 2.

In one embodiment, a fourth dock 30D of the case 20 is configured to releasably retain a peripheral device 14D such as a pointer. More specifically, in one embodiment, the fourth dock 30D is configured to retain a mouse 14D. The fourth dock 30D includes a slot 44. The slot 44 is configured to allow a mouse 14D to be selectively removed from, and placed into, the fourth dock 30D. Optionally, the fourth dock 30D is configured to receive a mouse 14D with a relatively thin height, such as in a "slim mouse."

Figure 1F:
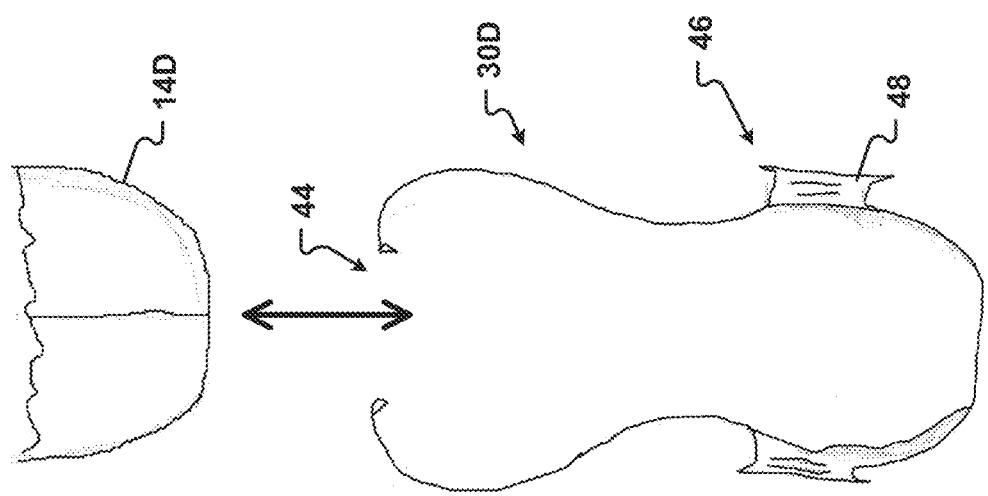
FIG. 1F is a top plan view of a dock configured to receive a mouse.

Referring now to FIG. 1F, the fourth dock 30D may further include a retention mechanism configured to releasably hold a mouse 14D in the fourth dock 30D. In one embodiment, the fourth dock 30D includes a latch 46. The latch 46 is released by squeezing two projections 48 associated with the fourth dock 30D. In one embodiment, the latch 46 is activated by one or more of gravity and tension. In another embodiment, a clutch is associated with the projections 48. More specifically, squeezing one or more of the projections 48 activates the clutch to release the latch 46.

The mouse 14D may connect to the portable computer 2 by a wireless connection. The wireless connection may be a USB or Bluetooth protocol. In one embodiment, the first dock 14A includes an interface aperture 38 to receive a USB receiver associated with the mouse 14D.

Referring now to FIGS. 2A-2G, a configurable case 120 of one embodiment of the present disclosure is generally illustrated. The configurable case 120 generally includes a base piece 122 and a cover 140.

The base piece 122 has a back portion 124 and a front portion 126. The base piece 122 is configured to engage an exterior surface of a display screen 6 of a portable computer 2 such that the back portion 124 is proximate to the display screen. In one embodiment, the base piece 122 is formed to fit to the exterior surface of the display screen 6. In another embodiment, the case 120 is interconnected to the portable computer 2 in a manner the same as, or similar to, case 20. Accordingly, the case 120 can include one or more of a strap, a flange, a projection, a fastener, a snap, a clasp, a hook and loop material, and a suction device configured to engage the display screen 6.

A flange 128 extends from a bottom edge of the base piece 122. In one embodiment, the flange 128 includes a first portion that extends approximately orthogonally from the base piece 122. A second portion of the flange 128 extends from the flange first portion. The flange second portion may be approximately parallel to a plane defined by the front portion 126. Accordingly, the flange 128 forms a latch or hook to engage the cover 140.

The front portion 126 of the base piece 122 includes a plurality of apertures 130. The apertures 130 have a predetermined size and shape. In one embodiment, the apertures 130 have a radial cross-section that is generally circular. However, other shapes are contemplated. Optionally, each aperture 130 has a depth of approximately 1/8 inch.

The apertures 130 may optionally be arranged in a grid pattern. For example, in one embodiment, the apertures 130 are arranged in rows and columns. Adjacent apertures may be separated by any predetermined distance. In one embodiment, adjacent apertures are separated by approximately 1 inch although the distance may optionally less or greater than 1 inch. The number or rows and columns can be related to the size of the display screen. More specifically, the number of rows can be related to the height of the display screen 6 and the number of columns can be related to the width of the display screen. In one embodiment, the number or rows is proportional to the height and the number of columns is proportional to the width. In one embodiment, the configurable case 120 includes 13 columns and 9 rows of apertures 130. Alternatively, in another embodiment, the configurable case 120 has 15 columns and 11 rows of apertures. Other configurations of a grid formed by the apertures 130 are contemplated.

Pegs 132 are configured to be selectively positioned in the apertures 130. The Pegs 132 generally include a shank 134 and a head 136. The shank 134 may have a geometry selected to frictionally engage an interior surface of an aperture 130. Optionally, a peg may be rotated to lock into an aperture. In one embodiment, the shank 134 has threads to engage internal threads formed in the apertures 130. In another embodiment, the shank 134 includes a catch to selectively engage a surface within an aperture. Optionally, the shank 134 can include a seal 138. The seal 138 may be formed of a material such as rubber and the like.

The peg head 136 is configured to be interconnected to a peripheral device 14. A user may thus arrange pegs 132 in the apertures 130 and subsequently attach a peripheral device 14 to the peg heads 136. In one embodiment, the peg head 136 has an exterior surface that is substantially planar. In another embodiment, the peg head 136 includes an adhesive such that the peg 132 may be releasably interconnected to a selected peripheral device 14. Alternatively, the peg head 136 may be configured to apply a suction force to interconnect to the peripheral device 14.

The cover 140 is selectively interconnectable to one or more of the base piece 122 and the portable computer 2. Optionally, the cover 140 is formed of a material that is transparent. The cover 140 includes a body portion 142. The body portion 142 has a geometry that generally corresponds to a display screen 6 of the portable computer 2. In one embodiment, the cover 140 includes two long edges and two short edges. The long edges are oriented generally horizontally when the case 120 is interconnected to a portable computer 2.

A flange 144 extends from each short edge of the cover. The flanges 144 are configured to interconnect the cover 140 to the base piece 122. In one embodiment, the flanges 144 are configured to extend at least partially to edges of the display screen 6 of the portable computer 2 to which the configurable case 120 may be engaged. In this manner, the flanges 144 may be used to interconnect the configurable cover 120 to both the base piece 122 and to a selected portable computer 2.

In one embodiment, a flange 146 extends from at least a portion of a long edge of the cover body portion 142. The long edge flange 146 can be configured to engage a top edge of the display screen 6 of the portable computer 2. In one embodiment, the long edge flange 146 includes a first portion extending generally orthogonally from the cover body portion 142. A second portion of the long edge flange 146 extends about orthogonally from the first portion. Accordingly, in one embodiment, the long edge flange 146 has a shape that generally forms a hook to engage the display screen 6.

Figure 2A:
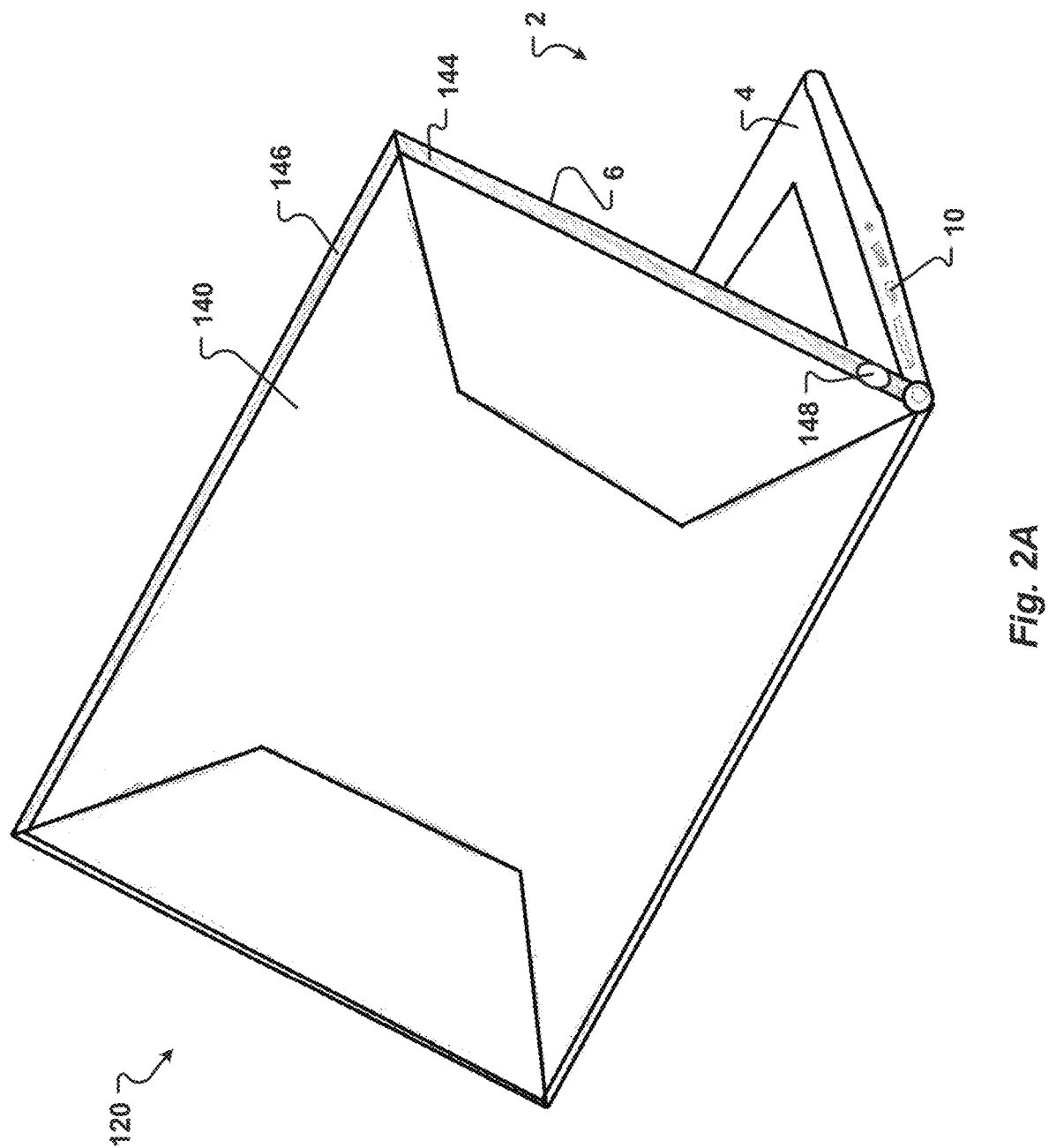
FIG. 2A is a front perspective view of another embodiment of a case of the present disclosure interconnected to a display screen of a portable computer.
Figure 2G:
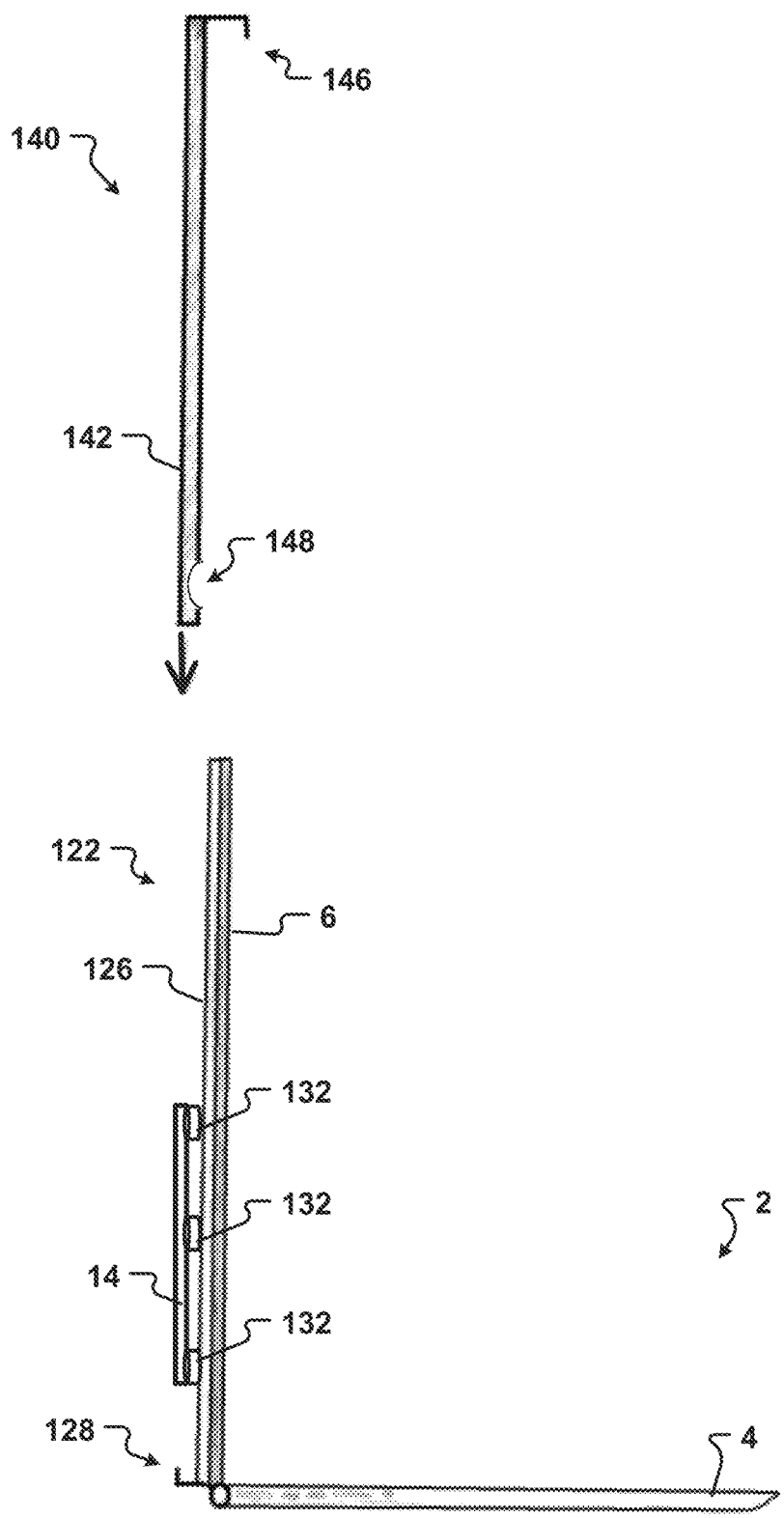
FIG. 2G is a right elevation view of the base piece of the case interconnected to a portable computer and further illustrating the cover aligned to be interconnected to the base piece.

In one embodiment, the cover 140 is configured to slide over the base piece 122 as generally illustrated in FIG. 2G. When positioned on the base piece 122, an interior surface of the cover body portion 142 is a predetermined distance from the front portion 126 of the base piece 122. In this manner, the cover 140 may be interconnected to the base piece 122 when one or more peripheral devices 14 are retained by pegs 132 to the base piece 122. The predetermined distance between the interior surface of the cover body portion 142 and the front portion 126 may optionally be between approximately 0.25 inches and approximately 3.5 inches. In one embodiment, the predetermined distance is between approximately 0.75 inches and approximately 2.5 inches.

The case 120 can also include an aperture 148 for a cable. The aperture 148 may be formed through any portion of the case. In one embodiment, the aperture 148 is proximate to a corresponding interface port 10 of the portable computer 2. In this manner, a cable of a peripheral device 14 may exit from the case 20 proximate to an interface port 10 of the portable computer 2. Optionally, the aperture 148 can be formed through a flange 144 of the short edge of the case.

Referring now to FIGS. 3A-3E, yet another embodiment of a case 220 of the present disclosure is generally illustrated. The case 220 generally comprises a body 222 with pockets 230 configured to receive peripheral devices. The body 222 is configured to be attached to an exterior surface of a display screen 6 of a portable computer 2. In one embodiment, one or more edges of the body 222 include hooks or latches to interconnect the case 220 to a selected computer display screen 6. In another embodiment, a back portion 224 of the body 222 includes an adhesive such that the body 222 may be interconnected to a selected computer display screen 6. Additionally, or alternatively, the body 222 can interconnect to the display screen 6 in the same or similar manner as one or more of case 20 and case 120.

The body 222 can optionally include a strap 228 configured to engage a portion of the computer display screen 6. In one embodiment, the strap 228 extends from a narrow edge of the body 222 to an adjacent long edge of the body. The strap 228 may be oriented generally transverse to each of the narrow edge and the long edge. Accordingly, a corner of the computer display screen 6 may be positioned between a back portion 224 of the body 222 and the strap 228. In one embodiment, the strap 228 is formed from a transparent or translucent material. In another embodiment, at least one end of the strap 228 is selectively interconnectable to the body 222. Optionally, the body includes two straps 228. A first strap 228 may extend from a first short edge of the body to the long edge. A second strap 228 may extend from a second short edge to the long edge of the body 222. Additionally, or alternatively, a strap 228A can extend from the first short edge to the send short edge of the body 222. Optionally, the strap 228A may be configured to be proximate to the base 4 of the portable computer 2.

Pockets 230 are interconnected to a front portion 226 of the body 222. The body 222 may include any number of pockets 230. In one embodiment, the body includes nine pockets 230.

Each pocket 230 is configured to receive a peripheral device 14. Optionally, two or more of the pockets 230 may have a substantially uniform size and shape. Alternatively, a first pocket 230 may have a different size or shape than a second pocket 230.

A pocket 230 includes at least one closed edge 234 and at least one open edge 236. The closed edge 234 may have an arcuate shape. More specifically, in one embodiment, a pocket 230 may have a closed edge 234 with a shape that is generally semicircular. In another embodiment, a pocket 230 has a shape that is generally rectangular. Optionally, a closure can be associated with an open edge 236 of a pocket 230. The closure can be one or more of a hook, a snap, a button, a zipper.

The pockets 230 can be formed from a web of material. More specifically, in one embodiment, cords 232 are formed into a mesh net. One or more cords 232 may be elastic. In one embodiment, a cord 232 proximate to an open edge 236 of a pocket 230 is elastic.

One or more of the cords 232 of a pocket 230 are interconnected to the body 222. In one embodiment, at least one of the cords 232 may be secured to the body 222 by an adhesive. In another embodiment, one or more of the cords 232 are tied or knotted to the body 222.

Figure 3A:
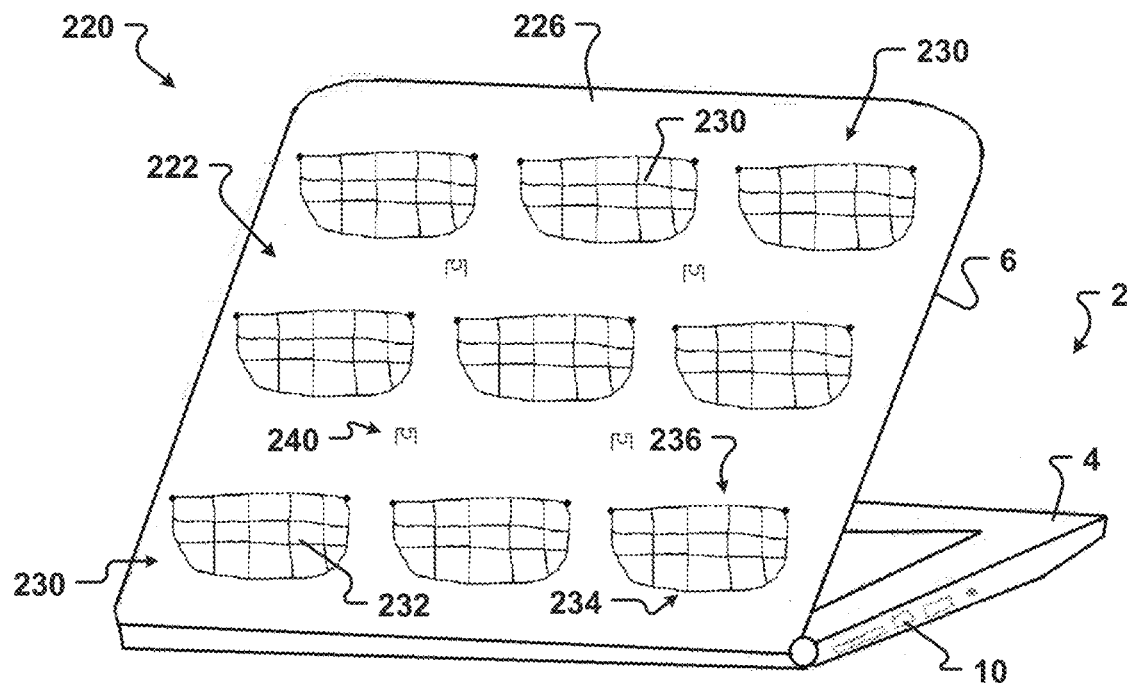
FIG. 3A is a front perspective view of yet another embodiment of a case of the present disclosure interconnected to a display screen of a portable computer.
Figure 3B:
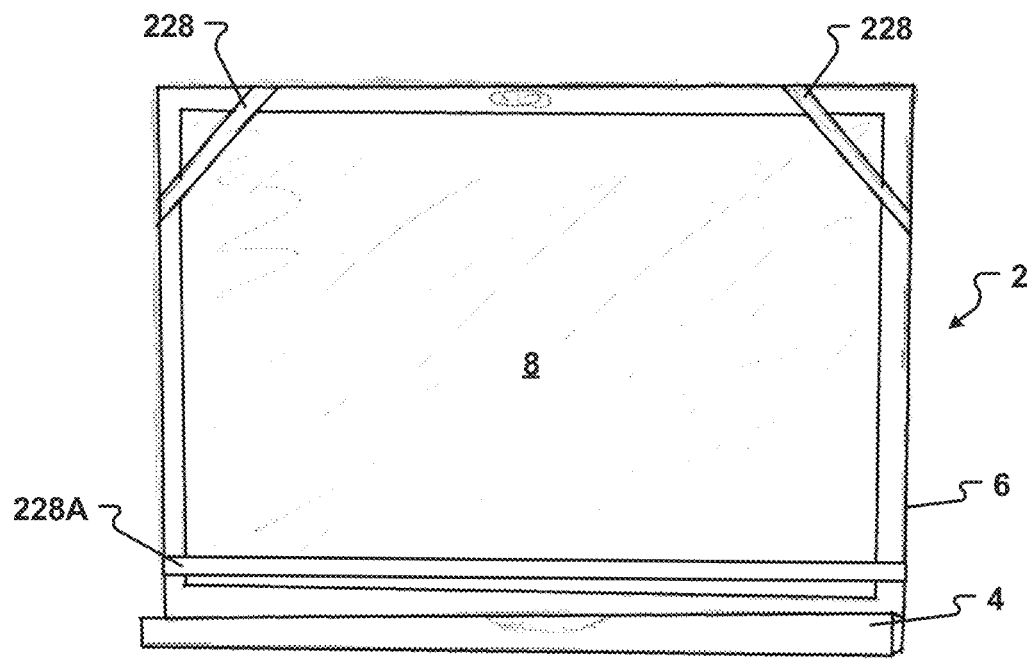
FIG. 3B is a rear elevation view showing the cover of FIG. 3A interconnected to the display screen of the portable computer.
Figure 3C:
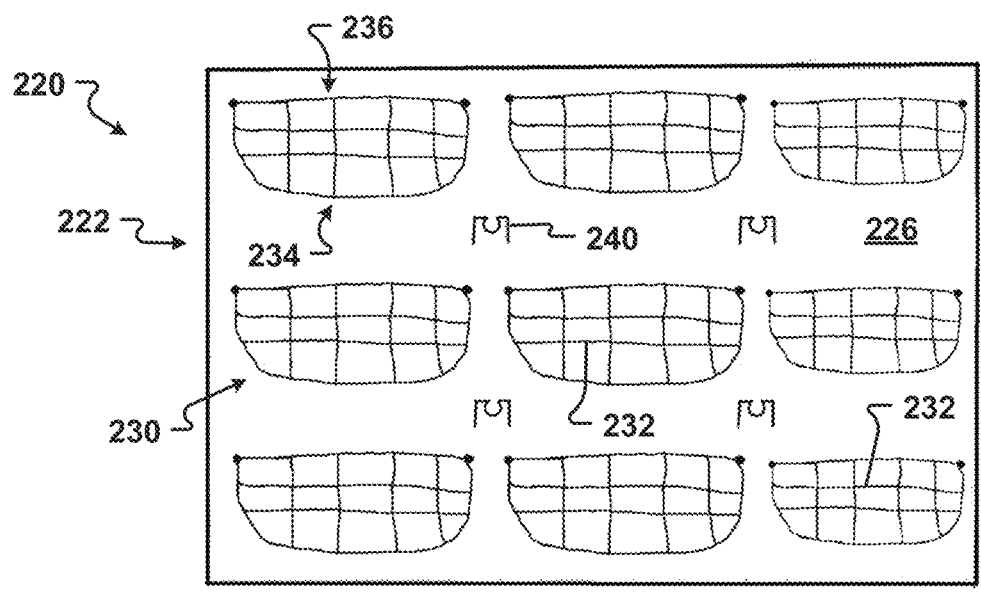
FIG. 3C is a front elevation view of the case of FIG. 3A.
Figure 3D:
FIG. 3D is an elevation view of a cable retainer of an embodiment of the present disclosure.
Figure 3E:
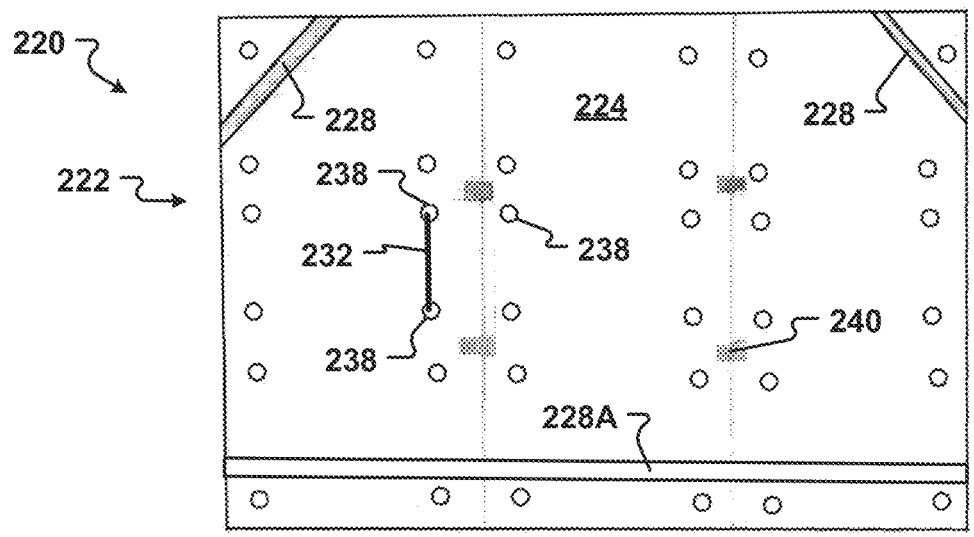
FIG. 3E is a rear elevation view of the case of FIG. 3A.

Referring now to FIG. 3E, the body 222 can optionally include at least one aperture 238 to retain a cord 232. The aperture 238 may extend through the body 222. A free end of a cord 232 can be threaded through an aperture 238. The free end may then be knotted to secure the cord 232 to the body 222. Optionally, a free end of a cord 232 can be threaded into a first aperture 238 from the face portion 226 of the body 222. The free end can then be threaded out of a second aperture 238 from the back portion 224 of the body 222.

The body can also include a cable retainer 240. In one embodiment, the body 222 includes four cable retainers 240. Optionally, a cable retainer 240 may be associated with each of the pockets 230. A cable retainer 240 may be aligned with two columns of pockets 230. Additionally, or alternatively, a cable retainer 240 can be aligned with two rows of pockets.

Referring now to FIGS. 4A-4K, another embodiment of a case 320 of the present disclosure is generally illustrated. The case 320 generally comprises a body 322. The body 322 is configured to be attached to an exterior surface of a display screen 6 of a selected portable computer 2. The body 322 may be attached to the portable computer 2 in a manner the same as, or similar to, one or more other cases 20, 120, 220 of the present disclosure.

Optionally, and referring now to FIG. 4B, in one embodiment, a flange 338 may extend from a back portion 324 of the case 320. The flange 338 can be configured to engage a portion of the display screen 6. More specifically, in one embodiment, the flange 338 is configured to engage a portion of the display screen 6 to interconnect the case 320 to the portable computer 2.

A front portion 326 of the body includes at least one slot 340. The slot 340 is configured to receive a container 350. More specifically, the slot 340 can have a geometry selected to retain a container 350 with a corresponding shape. In one embodiment, the slot 340 has two sidewalls 342. The sidewalls 342 angle toward each other proximate to the face portion 326 of the body 322. In one embodiment the slot 340 has a cross-section of a trapezoid with two legs angled toward each other and an open base that is narrower than a closed base.

The case 320 may have any number of slots 340. In one embodiment, the container includes three slots 340. The slots 340 can be configured to receive any number of containers 350. Optionally, two containers 350 can be positioned in each slot 340. Accordingly, in one embodiment, each slot 340 is configured to retain a first container 340 in a first position and a second container 340 in a second position.

Figure 4E:
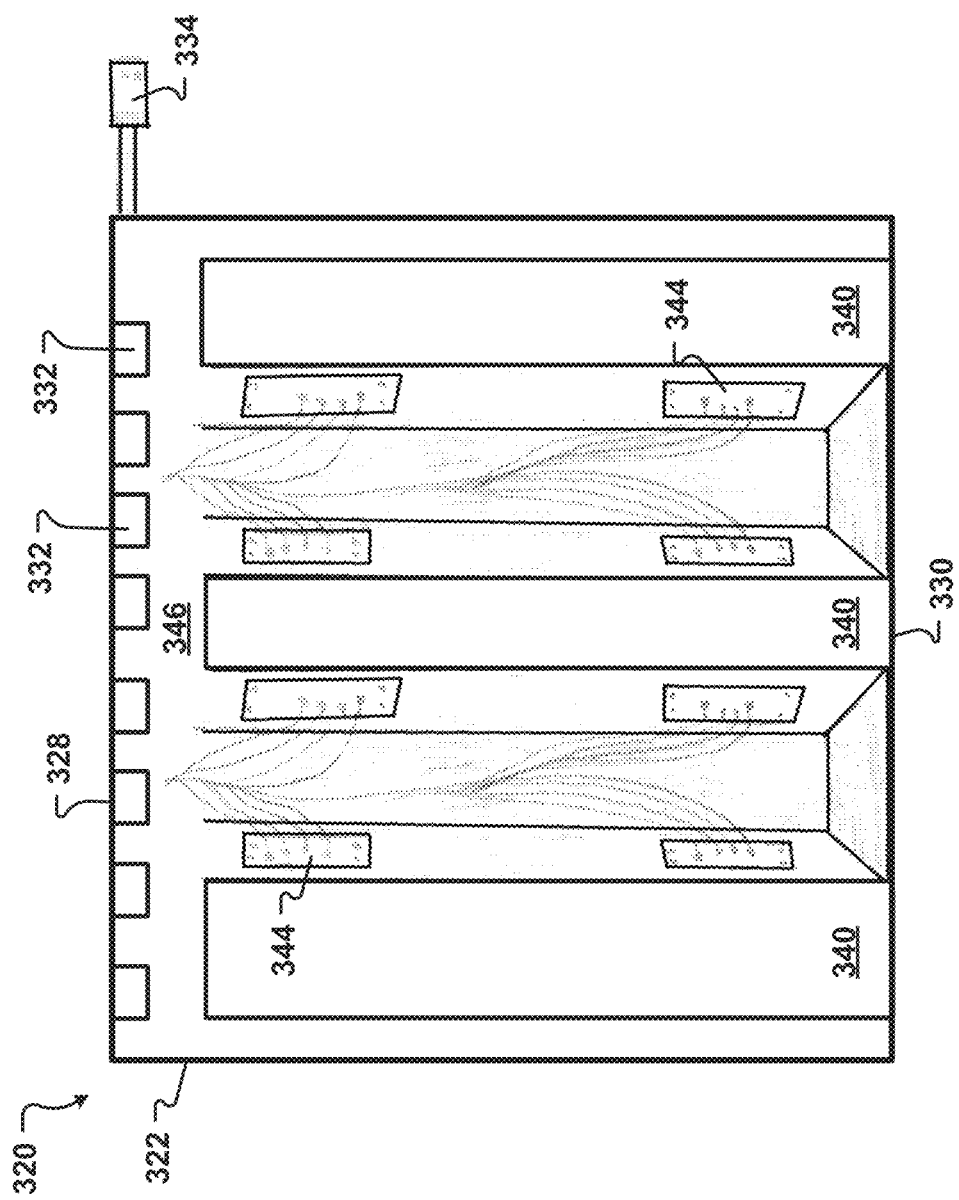
FIG. 4E is a rear elevation view of the case of FIG. 4B with a bottom portion of the case removed to illustrate interior spaces of the case.

A bottom end 328 of the case includes interfaces 332, such as USB ports. In one embodiment, at least one of the interfaces 332 is a USB hub controller. Referring now to FIG. 4E, in one embodiment, the body 322 includes a cavity 346 proximate to the bottom end 328. The cavity 346 may be used to route wiring to interconnect the interfaces 332 to jacks 344 which are accessible from the slots 340.

The interfaces 332 are interconnected a master jack 334. The master jack 334 is configured to connect to an interface port 10 of the portable computer 2. In one embodiment, the master jack 334 is a USB jack. However, other protocols may be used for the master jack 334 of the present disclosure. In one embodiment, the master jack 334 includes a cable. Accordingly, the master jack 334 may extend from the body 322 to electrically connect the container 350 to a portable computer 2 to which the case 320 is configured to be connected. Optionally, a clip 336 may be positioned on the case 320 to support the cable of the master jack 334.

Referring now to FIGS. 4F-4H, the container 350 has a shape that generally corresponds to the shape of the slot 340. In one embodiment, a transverse cross section of the container 350 is generally trapezoidal, such as generally illustrated in FIG. 4G. In one embodiment, the container 350 is sized to be frictionally retained within the slot 340. In another embodiment, the container 350 can slide along a longitudinal axis of the slot 340. More specifically, in one embodiment, the container 350 and slot 340 have a relationship similar to a sliding dovetail joint.

The container 350 includes a chamber 354 configured to receive a selected peripheral device 14. The container 350 may include an aperture 356 for access to the chamber 354. The aperture 356 has a size selected to receive the peripheral device 14. Optionally, a cover 358 is configured to seal the aperture 354. In one embodiment, the cover 358 is slidingly associated with the container 350. In another embodiment, the cover 358 can rotate or pivot with respect to the aperture 354.

An interface port 360 is optionally associated with the chamber 354. In this manner, a peripheral device 14 positioned within the chamber 354 can be electrically interconnected to the container 350. In one embodiment, the interface port 360 is a USB port. Alternatively, the interface port 360 may have a different configuration. In one embodiment, the port 360 is an Apple Lightning jack. Optionally, the container may have at least one of a male port and a female port. In another embodiment, a first container has a male port 360 and a second container has a female port.

The container 350 also may optionally include an external connector 362. Optionally, the external connector 362 can be configured to be compatible with a USB 3.0 pinout format. Other configurations of the external connector 362 are contemplated. The external connector 362 is configured to engage a jack 344 of the case 320 when the container is positioned within the slot 340. In one embodiment, the jack 344 is positioned within the slot 340, for example, as generally illustrated in FIG. 4E. Accordingly, when the container external connector 362 engages a jack 344, power and data may be transferred between one or more of the container 350, a peripheral device 14 in the container, the case 320, and the portable computer 2.

The container 350 optionally includes a hook 352. The hook 352 can engage a retainer 348 associated with the slot 340 to selectively interconnect the container 350 to the case 320. The hook 352 can be configured to at least one of bend, compress, and alter shape to selectively fit past the retainer 348. More specifically, in one embodiment, a front portion 353 of the hook 352 has a shape selected to deflect the hook around a portion of the retainer 348. In this manner, contact of the hook front portion 353 with a selected portion of the retainer 348 will cause the hook 352 to move past the retainer 348 without engaging the retainer. Optionally, the container 350 can include two hooks 352. In one embodiment, the two container hooks 352 are substantially identical in shape.

Referring now to FIG. 4I, one embodiment of a retainer 348 is illustrated. The retainer 348 may generally comprise a post or peg 364 extending into the slot 340. Optionally, the peg 364 is generally cylindrical. The retainer 348 is configured to selectively engage a container 350. More specifically, in a first orientation the retainer 348 can engage a hook of a container 350. In a second orientation, the retainer 348 will not engage the container hook. In this manner, the retainer can be oriented to allow the container 350 to move along the slot 340.

In one embodiment, the peg 364 includes a notch 366. The notch 366 can be selectively aligned with the hook to one or more of engage the hook and create a passage through which the hook may pass without engaging the retainer 348.

Referring again to FIGS. 4B-4C, a first pair of retainers 348A can be oriented with respect to a slot 340B such that a container 350A can move within the slot without engaging the retainers 348A. In this manner, the retainers 348A can be oriented such that the container 350A may slide within the slot from a first position proximate to the body top end 330 to a second position of the slot proximate to the bottom end 328 of the body. The container 350A may then engage one or more of retainers 348B associated with the slot second position. A second container may subsequently be positioned in the first position of the slot 340B proximate. The second container 350 can then engage retainers 348A.

Referring now to FIG. 4J, in one embodiment, the retainer 348 can rotate axially with respect to the case 320. Optionally, the retainer 348 rotates axially when engaged by the hook 352. Alternatively, in another embodiment, the retainer 348 can be rotated axially to engage the hook 352. In this manner, the container 350 can be locked into the slot 340. In one embodiment, rotating the retainer 348 orients the notch 366 such that the hook 352 can pass through the notch 366 and the container can move beyond the retainer 348.

Referring now to FIG. 4K, additionally, or alternatively, the retainer 348 can be configured to move axially with respect to the case 320. In one embodiment, the retainer 348 can be depressed at least partially into the case 320 to engage a hook of a container 350. Alternatively, in the depressed position, the retainer 348 will not engage the container hook 352.

In one embodiment, the retainers 348 are biased outwardly to an engaged position. For example, a biasing means 370 can be associated with the retainers. In one embodiment, the biasing means 370 is a spring. The retainers 348 can be configured to catch in one or more of the engaged position and the disengaged position in response to a force pushing the retainers toward the body 322. Optionally, the notch 366 may be positioned on the retainer such that, in the engaged position, the notch 366 is positioned outside of the slot 340. Other configurations of the retainer 348 are contemplated. For example, in another embodiment, the peg 364 can be withdrawn from the slot such that the container 350 may move along the length of the slot without restriction. To retain the container 350, the peg 364 may project at least partially into the slot. In one embodiment, the peg 364 may fit into the container hook 352 when the peg projects into the slot.

Figure 5:
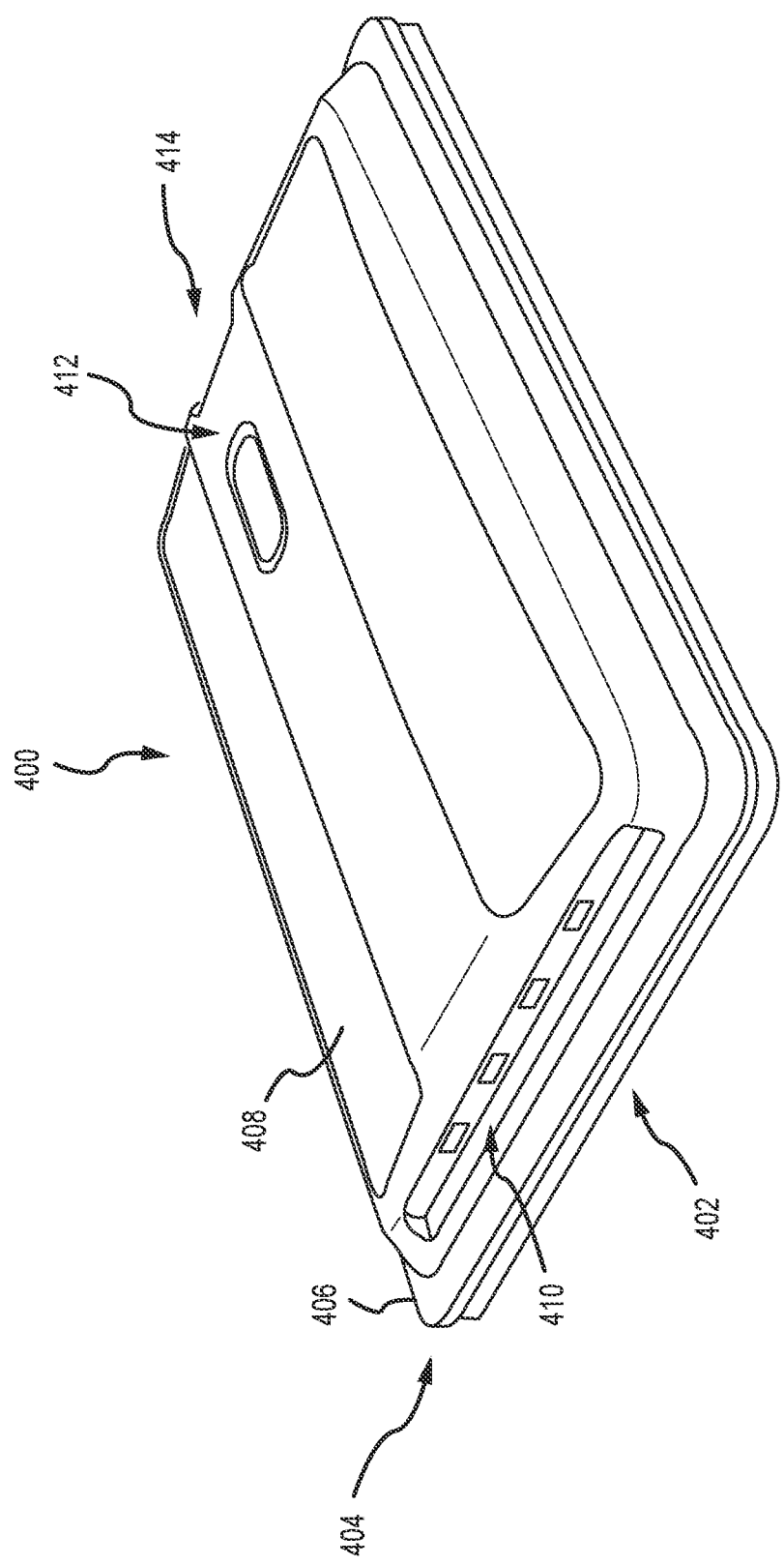
FIG. 5 is a perspective view of a case according to one embodiment of the present disclosure.

FIG. 5 is a perspective view of a laptop case 400 according to one embodiment of the present disclosure. As shown, the case 400 is operable to be attached to the rear side of a screen portion of a laptop 402. The case 400 of the embodiment of FIG. 5 does not completely surround, encapsulate or enclose a laptop computer. Accordingly, cases provided by the present disclosure are not limited to full enclosure type cases.

As shown in FIG. 5, the case 400 comprises a base member 404 having a lip or flange 406 that is sized and operable to connect to a laptop 402. The case 400 is preferably secured to a laptop by the flange 406. Specifically, in some embodiments, it is contemplated that an underside of the flange 406 comprises features to grasp and secure the case 400 to a laptop. Various features shown and described herein such as straps 228 are contemplated for selectively securing the flange 406 to the laptop 402. In some embodiments, one or more adhesives are provided to adhere or bond the case 400 to a laptop 402.

The case 400 further comprises cover member 408 comprising an upstanding portion extending from the flange 406. The cover member 408 comprises an area and a volume that is operable to receive and store various components as shown and described herein. In preferred embodiments, the cover member 408 is hingedly attached to the flange 406. The cover member 408 preferably comprises at least one hinge that allows the cover member 408 to open in a clamshell type fashion away from the base member 404 and/or the laptop 402, thus revealing contents of the cover member 408 and allowing for access to the same.

The cover member 408 comprises various storage features and functions including, but not limited to a port hub 410. The port hub 410 comprises at least one and preferably a plurality of ports (e.g. USB ports) that are accessible from an exterior of the case 400 regardless of the position of the case. The port hub 410 may be electrically connected to the laptop 402, and/or may be interconnected to a peripheral device provided within the case 400 (e.g. a supplemental battery device). Additional storage features including, but not limited to, a mouse dock 412 are provided. The mouse dock 412 comprises an area that is operable to receive, store, and/or charge a mouse (e.g. a wireless mouse). The case 400 comprises an access feature 414 for inserting and removing the mouse. In various embodiments, port hubs of the present disclosure comprise selectively removable port hubs. It is further contemplated that a plurality of selectively removable port hubs are provided, and at least some of the plurality of port hubs comprise interchangeable port hubs with different ports and/or features such that a user may customize and optimize the device for various purposes.

Figure 6:
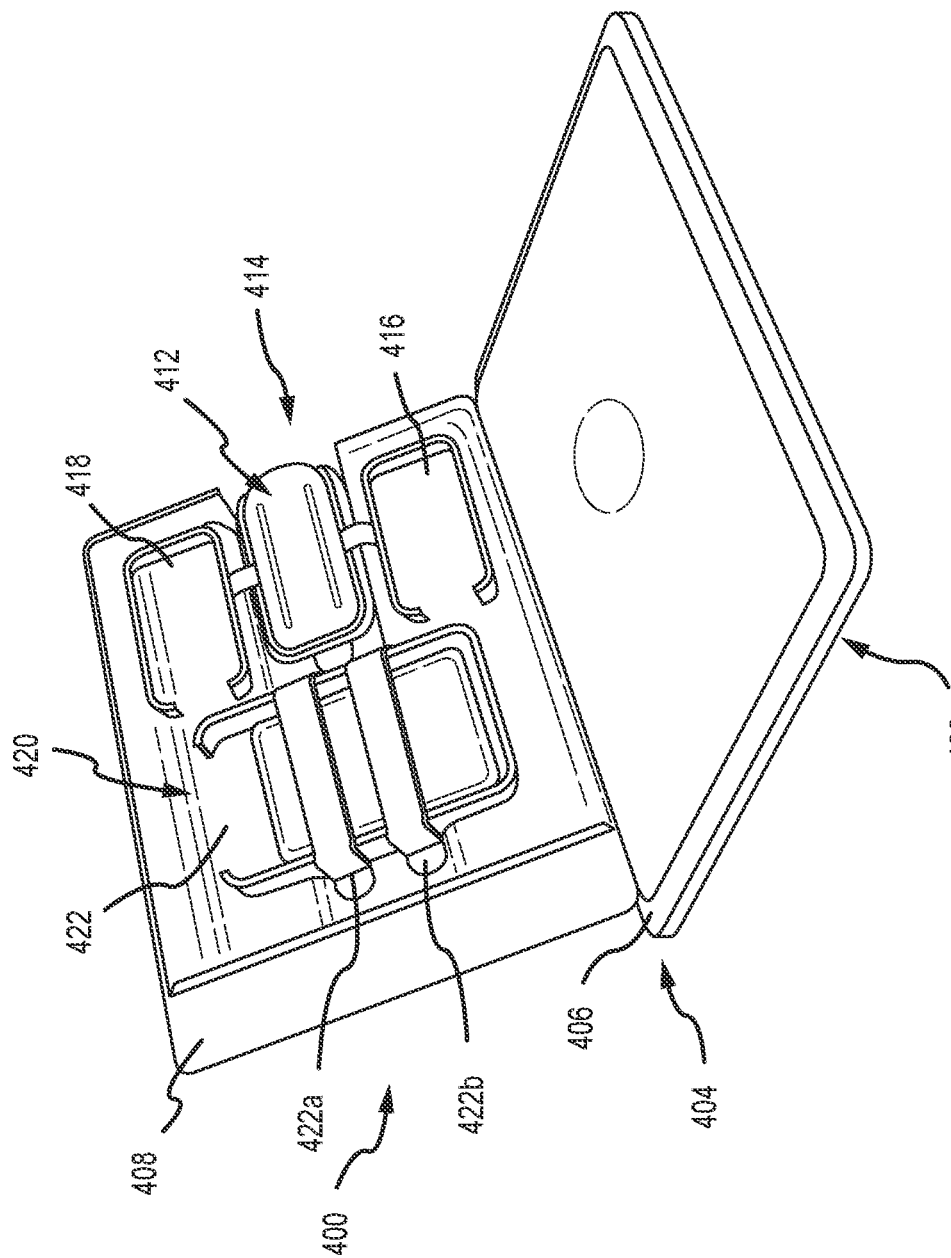
FIG. 6 is a perspective view of a case in an open position according to one embodiment of the present disclosure.

FIG. 6 is a perspective view of a case 400 provided in an open position wherein the cover member 408 has been rotated and opened away from the base portion 404 of the case 400. The case 400 is provided in combination with a laptop 402 that is provided in a closed position in FIG. 6. The embodiment of FIG. 6 comprises a cover member 408 having a plurality of internal storage features. As shown, the cover member 408 comprises a mouse dock 412 in which a wireless optical mouse is shown, and the mouse dock 412 comprises an access feature 414 wherein a mouse may be inserted and ejected from the case regardless of the position of the case. In various embodiments, the mouse dock 412 comprises at least one electrical connection wherein a wireless mouse (for example) may be charged when docked or not in use. Additionally, the case 400 comprises additional storage features 416, 418. In various embodiments, these features 416, 418 are provided as generic storage volumes for receiving various items based on user preference and needs. In some embodiments, at least one of the storage areas 416, 418 are provided as cable management features in which cables may be stored or wound.

The embodiment of FIG. 6 also comprises a storage compartment or feature 420 that is sized, arranged, and operable to receive various items including, but not limited to an external hard drive device or a supplemental battery device. The storage feature 420 comprises securing members 422a, 422b that are contemplated as comprising selectively removable straps (e.g. silicon rubber straps) to retain a device within the storage feature 420. In various embodiments, it is contemplated that the storage feature 420 comprises a storage area for receiving and housing various features, including an external hard drive or similar peripheral device. As shown in FIG. 6, the storage areas 416, 418, 420 comprise partially-open areas with at least opening 422. The opening is provided and sized to allow for cables and similar features to extend from a storage area. Preferably, the opening(s) are sized such that cables may extend from components stored within the areas 416, 418, 420, but are small enough to prevent accidental dislodgment of the stored devices. The storage areas 416, 418, 420 of some embodiments of the present disclosure comprise "C" shaped areas, at least when viewed in plan view.

FIG. 7 is a perspective view of a case 400 according to an embodiment of the present disclosure. As shown, the case 400 comprises various features shown and described with respect to FIGS. 5 and 6, and the discussion of those features is hereby incorporated by reference. The case 400 of FIG. 7 comprises a storage compartment 420 that is operable to receive and store various devices and which is further operable to provide such devices in electrical communication with various other components including, for example, a port hub (410 in FIG. 5) and/or a laptop 402. In some embodiments, the port hub comprises a removable hub that may be completely removed from the case. Additionally, although the hub may be referred to as a USB hub, one of ordinary skill in the art will recognize that hubs of the present disclosure are not limited to a particular type of port. Hubs 410 of the present disclosure may comprise various connection ports and means other than USB ports. In some embodiments, a hub is provided with a plurality of different ports (e.g. USB, various APPLE™ ports, headphone jacks, etc.).

As further shown in FIG. 7, the storage compartment 420 comprises device securing means in the form of a silicon rubber cover 421. The cover 421 of FIG. 7 comprises an elastic cover member that is operable to extend around and secure to a perimeter of the storage compartment 420 and secure a device provided within the compartment. The case 400 of FIG. 7 further comprises at least connection 430 wherein a device stored within the compartment 420 is stored in a connected manner. Specifically, a device provided within the confines of the storage compartment 420 is connected to additional features of the case, such as a port hub. In various embodiments, cases 400 of the present disclosure provide cable trays and conduits to allow a user to install and connect a preexisting cable to a device stored within the compartment 420. In further embodiments, the case 400 comprises built-in connection features including USB connections (for example) that are integrated into the case. The case 400 allows a user to connect various devices (phones, cameras, etc.) to a device stored within the storage compartment 420 regardless of the position of the case. For example, an external device such as a phone can be connected to a supplemental battery stored within the compartment 420 by connecting the phone (not shown) to the port hub (410 in FIG. 5) which is further connected to a battery stored within the compartment 420. The phone can thus be charged regardless of the position of use and state of the case 400 and/or laptop 402.

FIG. 8 is a perspective view of a case 400 according to an embodiment of the present disclosure. The case 400 comprises various features as already shown and described with respect to FIGS. 6-7. That discussion is hereby incorporated by reference. The case 400 of FIG. 8 comprises a device retention member 440 as shown. The member 440 preferably comprises a member having an elasticity. The member 440 is FIG. 8 comprises an "X" shaped silicon retention member that is selectively removable to enable the insertion and extraction of various devices to and from the storage compartment 420.

Figure 9B:
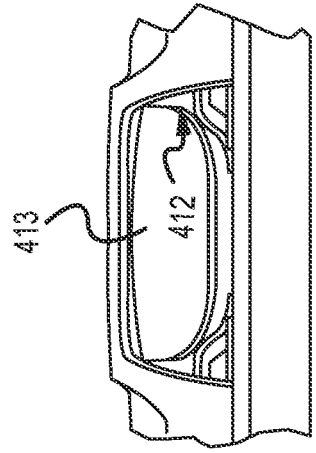
Figure 9D:
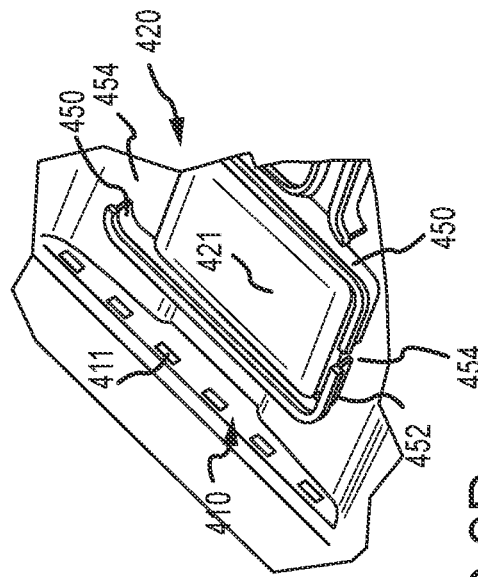
FIG. 9d is a detailed perspective view of a portion of a case according to one embodiment of the present disclosure.
Figure 9A:
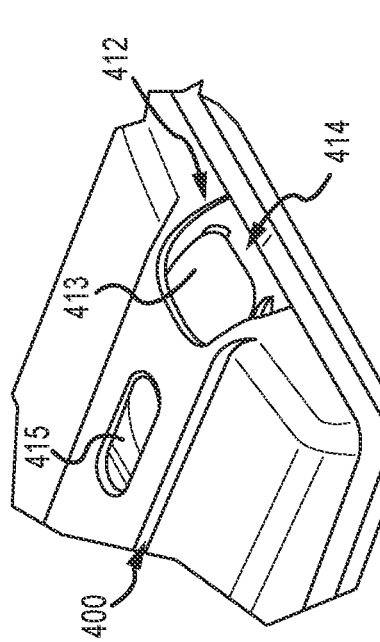
FIG. 9a is a detailed perspective view of a portion of a case according to one embodiment of the present disclosure.

FIGS. 9a-9d are detailed views of a docking and storage features according to one embodiment of the present disclosure. As shown, a case 400 comprises a docking feature 412 that is operable to receive a peripheral device (e.g. a wireless mouse). The docking feature 412 comprises an access opening 414 through which the device 413 is insertable and removable. The case comprises an access aperture 415 to allow a user to extract a device 413. For example, a user may access and translate the device 413 via the oblong aperture 415 provided in the case. As shown in FIGS. 9a-9b, the docking feature 412 is usable and accessible via the opening 414 regardless of the position of the case.

Figure 9C:
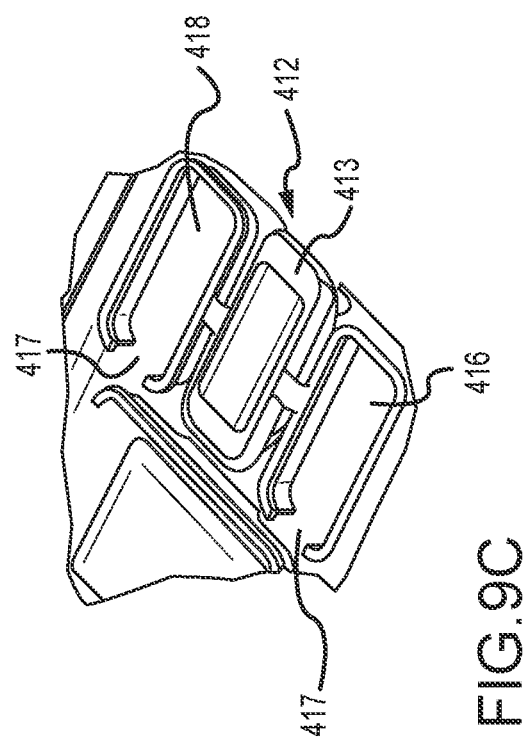
FIG. 9c is a detailed perspective view of a portion of a case according to one embodiment of the present disclosure.

FIG. 9c is a view of an interior of the case 400 including a docking feature 412. As shown, the docking feature 412 is provided with a stored device 413. First and second storage features 416, 418 are provided on opposing sides of the docking feature 412. The first and second storage features 416, 418 comprise upstanding wall portions with a flange or lip at the upper portion thereof. Although not shown in FIG. 9c, various straps, silicon bands and other retention means and members are contemplated for covering or partially covering the first and second storage features 416, 418. The first and second storage features 416, 418 each preferably comprise a gap or opening 417 through which various features (e.g. cables) may extend. The partially-open wall construction of the storage features of the present disclosure allow for various stored devices to be interconnected within a case.

FIG. 9d is a perspective view of an interior of a case 400 comprising a storage feature 420 in which a peripheral device 421 is provided. The peripheral device 421 may comprise various different devices, depending upon user preference and needs. For example, the peripheral device 421 may comprise an external hard drive. The storage feature 420 comprise upstanding sidewalls 450 that are operable to surround and at least partially contain the device 421. The upstanding sidewalls 450 comprise a lip or flange 452 at an upper portion thereof to further contain a device 421. The sidewalls 450 comprise at least one and preferably two gaps 454 to allow a path for wired connections to and from the device 421. The device 421 may thus be connected to a port hub 410, for example, which comprises a plurality of connections ports 411. Through this connection, the device 421 is operable to be connected to external devices (phone, power sources, etc.) without having to open or access an internal portion of the case 400.

Figure 10:
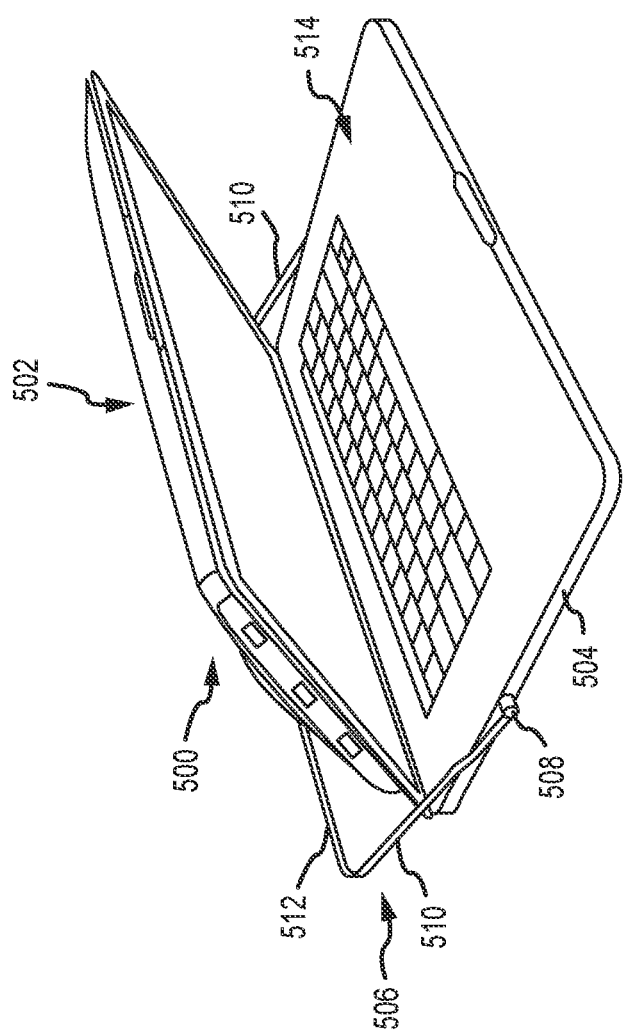
FIG. 10 is a perspective view of a device case and a device according to one embodiment of the present disclosure.

FIG. 10 is a perspective view of a device case 500 according to one embodiment and wherein the case 500 is provided on or with a device 514. The device 514 is contemplated as comprising a laptop or other personal electronic device. The case 500 of FIG. 10 comprises a cover member 502 and a base member. Such features are shown and described herein (see, for example, FIG. 5 and the related discussion which is incorporated by reference). The case 500 further comprises a bottom portion 504 that is preferably sized and operable to receive and connect to a base of the device 514. The device 500 of FIG. 10 comprises a hinge support 506. The hinge support 506 is provided and operable to support a preexisting hinge of a laptop device 514, for example. As will be recognized by one of ordinary skill in the art, cases 500 of the present disclosure comprise a mass and are operable to receive, store and house additional mass. The provision of such a device on a preexisting laptop 514 will necessarily increase the amount of weight on the screen portion of the laptop and alter the center of mass of the assembled system shown in FIG. 10. Therefore, in at least some embodiments, a hinge support 506 is provided that is operable to provide structural support to a hinge of a preexisting laptop that is generally disposed between a base and keyboard portion of a laptop and a screen portion. The hinge support 506 of FIG. 10 comprises a wireframe or similar member with minimal weight and sufficient structural strength to provide support to the device.

In some embodiments, a hinge support is provided by comprises a rotatable rigid support that extends from the case and has a free end that is operable to contact a desk or similar surface upon which the case and device rests. Features similar to those shown and described in U.S. Patent Application Publication No. 2016/0216742 to Lee, which is hereby incorporated by reference in its entirety, are contemplated for use with embodiments of the present disclosure.

The hinge support 506 is preferably hingedly attached at a hinge 508 such that an angular position of the hinge support 506 can be adjusted. For example, the hinge support 506 can be rotated about the hinge 508 between at least a position of use (see FIG. 11, for example) and a stored position when the laptop is not in use. The hinge support 506 of FIG. 10 comprises first members 510 that are substantially parallel, and a second member 512 that is provided substantially perpendicular to the first members 510. The second member 512 comprises at least one surface upon which the screen of the laptop 514 can rest, while the first members 510 generally comprise members that are operable to receive a tension force and provide support the hinge of the laptop 514.

Figure 11:
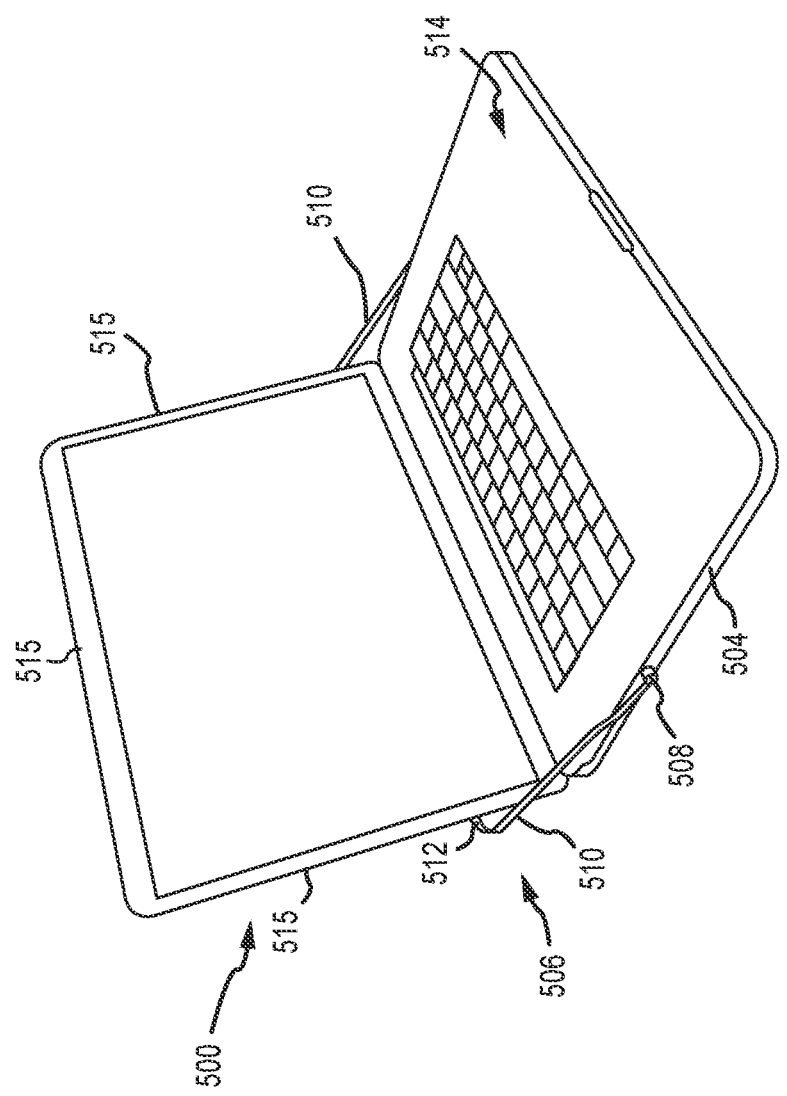
FIG. 11 is a perspective view of a device case and a device according to the embodiment of FIG. 10.

FIG. 11 is a perspective view of a laptop 514 and a case 500 according to the embodiment of FIG. 10 and wherein the laptop 514 is provided in an open position of use. As shown, the hinge support 506 is provided to receive and support a screen portion of a laptop 514 and provide structural support to the hinge of the laptop. While various embodiments of the present disclosure are contemplated that do not comprise a hinge support 506, such features are contemplated in some embodiments to shift and/or reduce the load provided on the laptop hinge by features of the present disclosure. Hinge supports 506 of the present disclosure are contemplated as providing support and extending a usable life of laptop hinges that comprises various levels of durability and strength based on the laptop manufacturer, for example.

In various embodiments, including but not limited to that shown in FIG. 11, a plurality of connection members 515 are provided on the case to connect and secure the case to a laptop 514. In some embodiments, the connection members 515 comprise resilient hooks or clasping members that extend from the base of a case 500 and "clip" or secure onto the laptop screen.

FIG. 12 is a perspective view of a case 500 and an associated laptop wherein the case 500 and the laptop are provided in a closed position. As shown, the cover member 502 of the case which comprises a clamshell feature capable of storing various items and supplementing the functionality of a laptop, is provided in a closed position. The hinge support 506 is rotated about the hinge 508 to a storage position, wherein the storage position comprises a position wherein the hinge support 506 extends around a front portion of the bottom portion 504 and associated laptop. As shown in FIG. 12, the hinge support 506 is sized and positioned to convert between a position of use (FIG. 11, for example), and a position of storage in FIG. 12 wherein the hinge support 506 extends neatly around the device. The hinge 508 about which the hinge support 506 is rotatable is positioned off-center relative to the bottom portion 504. In some embodiments, the hinge 508 is provided closer to a rear portion of the bottom portion 504 than the front. As shown in FIG. 12, for example, the hinge 508 is positioned approximately at a point that is approximately two-thirds of the distance between the front and rear of the bottom portion 504.

FIG. 13 is a perspective view of the case 500 of FIGS. 10-12, wherein the case is provided in an open position and the hinge support 506 is rotated to a position to support the cover member 502 and the screen of a laptop 514.

Figure 14:
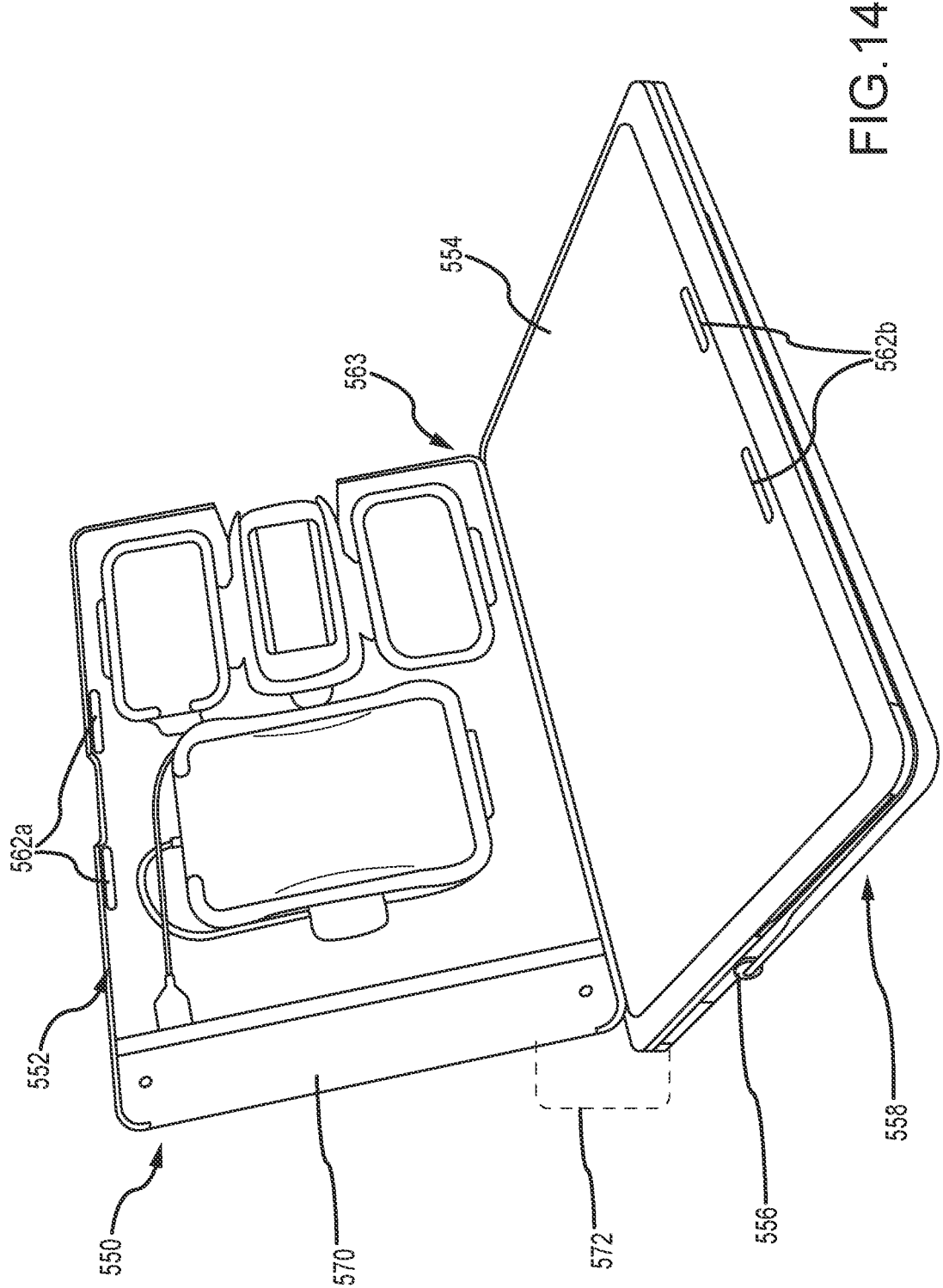
FIG. 14 is a perspective view of a device case and a device according to one embodiment of the present disclosure.

FIG. 14 is a perspective view of a case 550 according to one embodiment of the present disclosure. As shown, the case 550 comprises various features shown and described with respect to various embodiments including, for example, a cover member 552 that is rotatable relative to a base 554, a bottom portion 556, and a hinge support 558 with a hinge 560. As shown in FIG. 14, the cover member 552 is rotatable relative to the base 554 and is secured to the base 554 on one end by magnets 562a, 562b. Specifically, and as shown in FIG. 14, a free end of the cover member 552 is provided opposite a hinge 563. The free end of the cover member comprises at least one magnet 562a. A corresponding end of the base 554 comprises a corresponding number of magnets 562b of opposite polarity. Accordingly, the case 550 that is shown in an open position in FIG. 14 is operable to rotate to a closed position and be secured in the closed position by the magnets 562a, 562b. In various embodiments, alternative closure member in addition to or in lieu of magnets are contemplated. For example, various embodiments of the present disclosure contemplate that the case 550 and components thereof are closed or secured by resilient clasps, hook-and-loop closures, zippers, etc. Such features and/or the magnets 562a, 562b provided in FIG. 14 are contemplated for use in all of the embodiments disclosed herein and are not limited to being provided in the embodiment illustrated in FIG. 14.

Various embodiments of the present disclosure, including that of FIG. 14 comprise a port hub 570. The port hub 570 is contemplated as being provided in communication with, or at least being capable of being provided in communication with a laptop that is associated with the case 550. For example, a wired connection 572 is contemplated as being provided to provide the laptop in communication with the port hub 570 which may in turn be connected to one or more devices stored within the cover member 552. Accordingly, in addition to providing storage features, cases of the present disclosure further comprise the ability to supplement or augment the functionality of a laptop or similar electronic device. It is contemplated, for example, that external data storage means, power storage means, and various similar means and devices can be selectively provided within the case and wherein such means and device are in communication with a laptop (for example) provided within the case. In such a manner, laptop functionality (e.g. battery life, storage, etc.) is supplemented or improved by embodiments of the present disclosure.

In various embodiments, a device case and an electronic device (a laptop, for example) are operable to be connected. Such connections are contemplated as comprising various one-way and two-way connections. In some embodiments, at least one USB (or similar) port on a port hub of the case is provided as a USB-"out" port that is operable to receive a female end of a USB cable (and wherein the opposite, male end may be inserted into the laptop). Accordingly, in at least some embodiments, at least one port of a port hub comprises a USB-out port to provide greater options and functionality to a user. In some embodiments, a port of the port hub that is provided most proximal to the hinge portion of a laptop is provided as a USB-out port. Such devices may be marked, colored, or provided with various indicia.

While various embodiments of the disclosed device have been described in detail, it is apparent that modifications and alterations of those embodiments will occur to those skilled in the art. However, it is to be expressly understood that such modifications and alterations are within the scope and spirit of the present disclosure, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The foregoing discussion has been presented for purposes of illustration and description. The foregoing is not intended to limit the disclosure to the form or forms disclosed herein. In the foregoing description for example, various features of the disclosure have been identified. It should be appreciated that these features may be combined together into a single embodiment or in various other combinations as appropriate. The dimensions of the component pieces may also vary, yet still be within the scope of the disclosure. Moreover, though the description has included description of one or more embodiments and certain variations and modifications, other variations and modifications are within the scope of the disclosure, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present disclosure, in various embodiments, includes components, methods, processes, systems and/or apparatus substantially as depicted and described herein, including various embodiments, subcombinations, and subsets thereof. Those of skill in the art will understand how to make and use the devices of the disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A case for a portable computer in combination with a hub device, the case comprising:
   a body comprising a face portion and a back portion, wherein the body is configured to attach to the portable computer such that the back portion is operable to be provided adjacent to and contact the portable computer; and a plurality of docks for selectively receiving and storing peripheral devices, each of the plurality of docks being operable to and sized to receive a peripheral device;

the hub device comprising a plurality of interface ports operable to receive a connection from a plurality of peripheral devices provided in the docks;

a cable extending from the hub device and operable to communicate with the portable computer;

wherein the peripheral devices are operable to communicate with the portable computer via the hub device;

wherein at least some of the plurality of docks are not accessible to a user from the face portion when the case is secured to the portable computer, and wherein the docks and associated peripheral devices are accessible to a user from the back portion when the case is not secured to a laptop computer.

2. The case of claim 1, wherein the body comprises a plurality of straps to selectively secure the body to the portable computer.

3. The case of claim 2, wherein a first strap of the plurality of straps extends from a narrow edge of the body across the back portion to an adjacent long edge of the body.

4. The case of claim 1, wherein the hub device comprises a selectively removable hub device having a plurality of USB ports.

5. The case of claim 1, wherein the cable comprises a USB cable.

6. The case of claim 1, wherein the body includes a first narrow edge, a first long edge, a second narrow edge, and a second long edge.

7. The case of claim 1, wherein the body of the case comprises a cable router configured to direct a cable from the hub device to the portable computer.

8. The case of claim 7, wherein the cable router comprises a groove or channel in the back portion of the body.

9. The case of claim 7, wherein the cable router comprises a passage through an interior of the body.

10. A case for electronic devices, the case comprising:
a body comprising a first dock and a second dock;
the first dock comprising a hub device including a plurality of interface ports and a cable operable to place the hub device in communication with an electronic device to which the case is secured;
a second dock operable to selectively receive a peripheral device, and wherein the peripheral device is operable to communicate with at least one of the hub device and an electronic device to which the case is secured; and
wherein the body comprises a back portion operable to be provided adjacent to an electronic device to which the case is secured, and the body comprises a face portion that opposes the back portion and wherein the second dock is not accessible from the face portion.

11. The case of claim 10, wherein the body is generally rectangular.

12. The case of claim 10, wherein the hub device comprises a selectively removable port hub and wherein the port hub comprises a plurality of ports for receiving a physical connection to a device provided within the second dock.

13. The case of claim 12, wherein the port hub comprises at least one connection operable to provide the port hub in communication with the electronic device, wherein the body includes an aperture for a cable to connect the port hub to the electronic device, and wherein the body includes an interface aperture for an electrical connection to connect the port hub to an external peripheral device.

14. The case of claim 10, wherein the case comprises a cable router and wherein the cable router comprises at least one of a groove, a channel and a passage.

15. The case of claim 10, wherein at least one of the docks comprises a retention device on the back portion of the case to selectively secure a peripheral device.

16. The case of claim 15, wherein the retention device comprises at least one of a clip, a band, and a latch.

17. The case of claim 10, further comprising a third storage compartment for a third peripheral device.

\* \* \* \* \*